US011875731B2

(12) United States Patent
Yang et al.

(10) Patent No.: US 11,875,731 B2
(45) Date of Patent: Jan. 16, 2024

(54) DRIVE MODULE, VOLTAGE GENERATION METHOD THEREOF, AND DISPLAY DEVICE

(71) Applicants: Wuhan Tianma Microelectronics Co., Ltd., Wuhan (CN); Wuhan Tianma Microelectronics Co., Ltd. Shanghai Branch, Shanghai (CN)

(72) Inventors: Yang Yang, Wuhan (CN); Lei Suo, Wuhan (CN); Chaoqun Zhu, Wuhan (CN)

(73) Assignees: Wuhan Tianma Microelectronics Co., Ltd., Wuhan (CN); Wuhan Tianma Microelectronics Co., Ltd. Shanghai Branch, Shanghai (CN)

( * ) Notice: Subject to any disclaimer, the term of this patent is extended or adjusted under 35 U.S.C. 154(b) by 0 days.

(21) Appl. No.: 18/201,704

(22) Filed: May 24, 2023

(65) Prior Publication Data

US 2023/0326391 A1 Oct. 12, 2023

(30) Foreign Application Priority Data

Jan. 30, 2023 (CN) ......................... 202310099194.4

(51) Int. Cl.
*G09G 3/20* (2006.01)

(52) U.S. Cl.
CPC ..... *G09G 3/2096* (2013.01); *G09G 2330/021* (2013.01); *G09G 2330/028* (2013.01); *G09G 2370/04* (2013.01)

(58) Field of Classification Search
CPC . G06F 1/28; G09G 3/006; G09G 3/20; G09G 3/3208; G09G 3/3258; G09G 2330/021; G09G 2330/028; G09G 3/2096; G09G 2370/04; G09G 3/2092; G09G 3/3275; G09G 2330/024; H02M 1/0048; H02M 1/08; H02M 3/07; H02M 1/008;
(Continued)

(56) References Cited

U.S. PATENT DOCUMENTS

| | | | | |
|---|---|---|---|---|
| 2009/0085538 A1* | 4/2009 | Miguchi | ................. | H02M 3/07 323/273 |
| 2021/0090506 A1* | 3/2021 | Kim | ......................... | G09G 3/20 |

FOREIGN PATENT DOCUMENTS

| | | |
|---|---|---|
| CN | 112397027 A | 2/2021 |
| CN | 113674697 A | 11/2021 |
| CN | 113781943 A | 12/2021 |

* cited by examiner

*Primary Examiner* — Nelson M Rosario
(74) *Attorney, Agent, or Firm* — KDW Firm PLLC

(57) ABSTRACT

Provided are a drive module, a voltage generation method thereof, and a display device. The drive module includes a mainboard, a power chip, and a driver chip. The driver chip includes a main control unit and a base voltage generation unit. The main control unit is configured to determine the target value of a base voltage in the current drive display mode according to the current drive display mode, determine the optimal voltage multiplying relationship of the base voltage in the current drive display mode according to an analog reference voltage signal and the target value of the base voltage, calculate the actual output value of the base voltage according to the analog reference voltage signal and the optimal voltage multiplying relationship, and generate first instruction information including the actual output value. The base voltage generation unit generates the corresponding base voltage according to the first instruction information.

20 Claims, 7 Drawing Sheets

(58) Field of Classification Search
CPC .. H02M 3/156; H02M 3/1582; H02M 1/0045; H05B 45/38
See application file for complete search history.

DRIVE MODULE, VOLTAGE GENERATION METHOD THEREOF, AND DISPLAY DEVICE

CROSS-REFERENCE TO RELATED APPLICATION

This application claims priority to Chinese Patent Application No. CN 202310099194.4, filed on Jan. 30, 2023, the disclosure of which is incorporated herein by reference in its entirety.

TECHNICAL FIELD

Embodiments of the present disclosure relate to the field of display technology and, in particular, to a drive module, a voltage generation method thereof, and a display device.

BACKGROUND

A conventional display device generally includes a battery, a power chip, a driver chip, and a display panel. The battery provides electric energy to the power chip. The power chip provides power signals for the driver chip and the display panel. The driver chip provides a drive signal for the display panel. The power signal and the drive signal are essentially voltage signals. In the display device in the related art, there is the case where the voltage signal provided by a power chip and/or a driver chip does not match the voltage signal required for the actual display of the display device, thereby causing electric quantity loss, and affecting the overall power consumption of the display device.

SUMMARY

In view of this, the present disclosure provides a drive module, a voltage generation method thereof, and a display device to implement the dynamic adjustment of the voltage signal output by the drive module, thereby improving the voltage conversion efficiency and reducing the overall power consumption of the display device.

In a first aspect, an embodiment of the present disclosure provides a display module. The drive module includes a mainboard, a power chip, and a driver chip. The driver chip is electrically connected to the mainboard and the power chip respectively.

The power chip is configured to provide an analog reference voltage signal to the driver chip. The mainboard is configured to send a display mode control instruction to the driver chip. The driver chip is configured to output multiple base voltages.

The driver chip includes a main control unit and a base voltage generation unit.

The main control unit is configured to determine the current drive display mode according to the display mode control instruction and also configured to determine the target value of a base voltage in the current drive display mode according to the current drive display mode, determine the optimal voltage multiplying relationship of the base voltage in the current drive display mode according to the analog reference voltage signal and the target value of the base voltage, calculate the actual output value of the base voltage according to the analog reference voltage signal and the optimal voltage multiplying relationship, and generate first instruction information including the actual output value.

The base voltage generation unit is configured to generate the corresponding base voltage according to the first instruction information.

In a second aspect, an embodiment of the present disclosure provides a display device. The display device includes the drive module described in the first aspect of the present disclosure.

In a third aspect, an embodiment of the present disclosure provides a voltage generation method of a drive module. The drive module includes a mainboard, a power chip, and a driver chip. The driver chip is electrically connected to the mainboard and the power chip respectively. The driver chip includes a main control unit and a base voltage generation unit. The power chip is configured to provide the analog reference voltage signal to the driver chip. The mainboard is configured to send the display mode control instruction to the driver chip. The driver chip is configured to output multiple base voltages.

The voltage generation method includes the steps below.

The main control unit determines the current drive display mode according to the display mode control instruction provided by the mainboard and determines the target value of the base voltage in the current drive display mode according to the current drive display mode.

The main control unit determines the optimal voltage multiplying relationship of the base voltage in the current drive display mode according to the analog reference voltage signal and the target value of the base voltage, calculates the actual output value of the base voltage according to the analog reference voltage signal and the optimal voltage multiplying relationship and generates the first instruction information including the actual output value.

The base voltage generation unit generates the corresponding base voltage according to the first instruction information.

DETAILED DESCRIPTION

Figure 1:
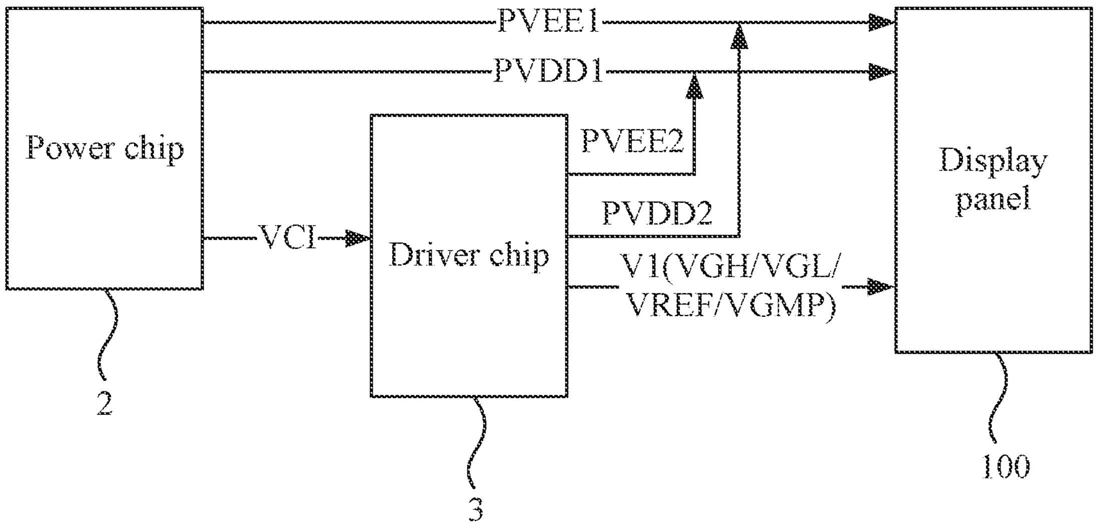
FIG. 1 is a diagram of transmission of a drive signal according to an embodiment of the present disclosure.

Hereinafter the present disclosure is further described in detail in conjunction with the drawings and embodiments. It is to be understood that the specific embodiments set forth below are intended to illustrate and not to limit the present disclosure. Additionally, it is to be noted that, for ease of description, only part, not all, of structures related to the present disclosure are illustrated in the drawings.

Terms used in the embodiments of the present disclosure are merely used to describe the specific embodiments and not intended to limit the present disclosure. It is to be noted that spatially related terms, including "on", "below", "left" and "right" used in the embodiments of the present disclosure, are described from the perspective of the drawings, and are not to be construed as a limitation to the present disclosure. In addition, in the context, it is to be understood that when a component is formed "on" or "below" another component, the component may not only be directly formed "on" or "below" another component, and may also be indirectly formed "on" or "below" another component via an intermediate component. The terms "first" and "second" are merely used for description and used to distinguish between different components rather than indicate any order, quantity, or importance. For those of ordinary skill in the art, specific meanings of the preceding terms in the present disclosure may be understood based on specific situations.

The term "comprising" and its variations used in the present disclosure are open-ended, that is, "including but not limited to". The term "based on" refers to "at least partially based on". The term "an embodiment" refers to "at least one embodiment."

It is to be noted that concepts such as "first" and "second" mentioned in the present disclosure are only used to distinguish corresponding contents, and are not used to limit the sequence or interdependence relationship.

It is to be noted that the modifications of "one" and "multiple" mentioned in the present disclosure are illustrative and not limited, and it is to be understood by those skilled in the art that unless the context clearly indicates otherwise, "one" or "multiple" should be understood as "one or more".

In the related art, the drive signal provided by a drive module to a display panel mainly includes: 1. a data signal; 2. the drive signal required by a gate drive unit; and 3. multiple drive signals directly provided to the display panel. A drive signal in 3 may be a base voltage in the present application. FIG. 1 is a diagram of transmission of a drive signal according to an embodiment of the present disclosure. With reference to FIG. 1, a base voltage V1 may generally include, but is not limited to, a high-level signal VGH, a low-level signal VGL, a positive power supply voltage PVDD, a negative power supply voltage PVEE, a VCL voltage (also referred to as a clamping voltage), an analog power signal AVDD, a reset signal VREF, and the maximum grayscale voltage VGMP. The preceding drive signal may be provided by a power signal and/or a driver chip. The high-level signal VGH and the low-level signal VGL may be used for providing a required voltage signal to a shift register unit in the display panel. The positive power supply voltage PVDD, the negative power supply voltage PVEE, the VCL voltage, the analog power signal AVDD, the reset signal VREF, and the maximum grayscale voltage VGMP may be used for providing a required voltage signal to the pixel circuits in the display panel. The basic voltage V1 output by the driver chip is converted according to a voltage multiplying formula on the basis of the analog reference voltage signal VCI provided by a power chip. The power chip and the driver chip are provided with voltage conversion circuits, such as a low-dropout (LDO) linear regulator, a charge pump, a buck converter, and a boost chopper circuit. The analog reference voltage signal VCI is converted into the base voltage V1 by a voltage conversion element according to the voltage multiplying formula. The analog power signal AVDD may be converted into the maximum grayscale voltage VGMP. The VCL voltage may be converted into the reset voltage VREF.

For the driver chip, the analog reference voltage signal VCI is an input voltage signal, and the base voltage V1 is an output voltage signal. The conversion efficiency of the base voltage V1 should be the ratio of the input voltage signal to the output voltage signal, that is, the conversion efficiency is equal to the value of the analog reference voltage signal VCI/the actual output value of the base voltage V1. On the basis of ensuring the normal display of the display device, the higher the conversion efficiency of the base voltage V1 is, the lower the power consumption of the display device is. Moreover, the target values of the base voltage V1 required by the display panel in different display modes are different. The smaller the difference between the target value of the base voltage V1 and the actual output value of the base voltage V1 is, the lower the voltage loss is, and the lower the power consumption of the display device is.

In the related art, in different display modes of the display device, the actual output value of each base voltage V1 is obtained by conversion through the use of the same voltage multiplying formula on the basis of the same analog reference voltage signal VCI. Table 1 is a comparison table of the actual output value of the base voltage V1 of a drive module and the target value of the base voltage V1 of the drive module in a related art provided for this embodiment of the present disclosure. With reference to Table 1, a drive display mode may be divided into a high-power display mode HBN, a normal display mode, a first Always on Display mode AOD1, and a second Always on Display mode AOD2. The left half of Table 1 includes the target value of each base voltage V1 in various display modes. The target value of a base voltage V1 may be the minimum value of the base voltage V1 when the drive display mode is implemented. The middle part of Table 1 includes an analog reference voltage signal VCI output by the power chip output in various display modes. The right half of Table 1 includes the actual output value of a base voltage V1 obtained by the driver chip through the use of a voltage multiplying formula in various display modes.

With reference to Table 1, in the related art, in the high-power display mode HBN and the normal display mode, the analog power signal AVDD is obtained by conversion through the use of the voltage multiplying formula AVDD=2VCI. The analog reference voltage signal VCI may be generally set at 2.7~3.6 V. In the related art, in different drive display modes, the analog reference voltage signal VCI is 3.3 V, the actual output value of the analog power signal AVDD is 6.6 V, and the conversion efficiency of the analog power signal AVDD is 3.3/6.6=0.5. However, the maximum grayscale voltage VGMP required in the normal display mode is 5 V, and the maximum grayscale voltage VGMP in the high-power display mode HBN is 5.4 V. In the normal display mode, the value of a data voltage Vdata varies between 0~5 V. In the high-power display mode HBN, the value of the data voltage Vdata varies between 0~5.4 V. Simply put, the target value of the analog power signal AVDD in the normal display mode may be 5 V. At this time, if the driver chip still outputs the analog power signal AVDD at a large actual output value (for example, 6.6 V), it is not beneficial to the improvement of the conversion efficiency, but causes the voltage difference between the actual output value of the base voltage V1 and the target value of the base voltage V1 to be large (6.6 V−5 V=1.6 V), and as a result, the power consumption is increased.

the current display mode, and further, the voltage loss is reduced and the overall power consumption of the display panel is reduced.

The above is the core concept of the present disclosure, and the technical solutions in the embodiments of the present disclosure are described clearly and completely hereinafter in conjunction with the drawings in the embodiments of the present disclosure. Based on the embodiments of the present disclosure, all other embodiments obtained by those of ordinary skill in the art without creative work are within the scope of the present disclosure.

TABLE 1

| Drive Display Mode | Target Value of a Basic Voltage | | | | | | | | Power Chip | Driver Chip | |
|---|---|---|---|---|---|---|---|---|---|---|---|
| | VGH | VGL | VREF | Vadta | VGMP | PVDD | PVEE | VCI | PVDD/ PVEE | voltage multiplying relationship | PVDD/ PVEE |
| HBM | 6 | −6 | −3.5 | 0~VGMP | 5.4 | 3.5 | −3.5 | 3.3 | 3.5/−3.5 | AVDD = 2VCI = 6.6<br>VCL = −2VCI = −6.6<br>VGH = AVDD = 6.6<br>VGL = VCL = −6.6 | high resistance state |
| Normal | 6 | −6 | −3.5 | 0~VGMP | 5 | 3.3 | −3.3 | 3.3 | 3.3/−3.3 | AVDD = 2VCI = 6.6<br>VCL = −2VC = −6.6<br>VGH = AVDD = 6.6<br>VGL = VCL = −6.6 | high resistance state |
| AOD1 | 6 | −6 | −3.1 | 0~VGMP | 5 | 3.3 | −3.1 | 3.3 | high resistance state | AVDD = 2VCI = 6.6<br>VCL = −VCI = −3.3<br>VGH = AVDD = 6.6<br>VGL = VCL = −3.3 | 3.3/−3.1 |
| AOD2 | 5 | −6.5 | −3.1 | 0~VGMP | 3.3 | 2.3 | −3.1 | 3.3 | high resistance state | AVDD = VCI + VDDI = 5.1<br>VCL = −VCI = −3.3<br>VGH = AVDD + VDDI = 6.9<br>VGL = VCL − AVDD = −8.4 | 2.3/−3.1 |

Based on the preceding defects, the present disclosure provides a drive module. The drive module includes a mainboard, a power chip, and a driver chip. The driver chip is electrically connected to the mainboard and the power chip respectively. The power chip is configured to provide an analog reference voltage signal to the driver chip. The mainboard is configured to send a display mode control instruction to the driver chip. The driver chip is configured to output multiple base voltages. The driver chip includes a main control unit and a base voltage generation unit. The main control unit is configured to determine the current drive display mode according to the display mode control instruction and also configured to determine the target value of a base voltage in the current drive display mode according to the current drive display mode, determine the optimal voltage multiplying relationship of the base voltage in the current drive display mode according to the analog reference voltage signal and the target value of the base voltage, calculate the actual output value of the base voltage according to the analog reference voltage signal and the optimal voltage multiplying relationship, and generate first instruction information including the actual output value. The base voltage generation unit is configured to generate the corresponding base voltage according to the first instruction information.

Figure 2:
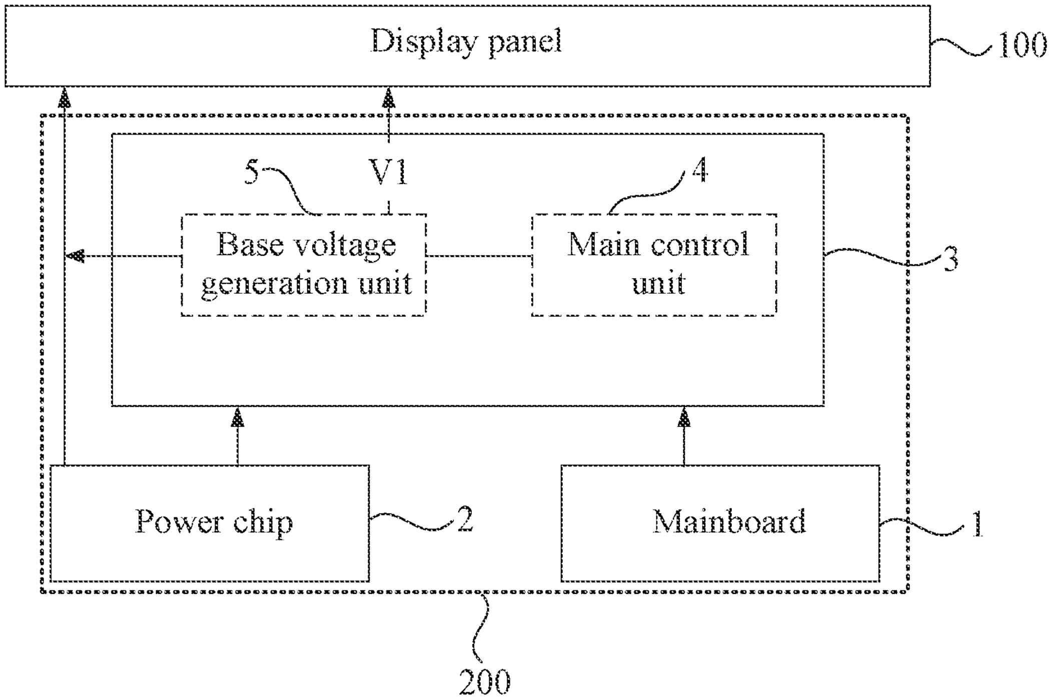
FIG. 2 is a diagram illustrating the structure of a drive module according to an embodiment of the present disclosure.

Through the use of the preceding solutions, on the basis of ensuring the normal display of the display device, the ratio of the analog reference signal to the actual output value of the base voltage can be increased as much as possible, that is, the conversion efficiency of the base voltage can be improved as much as possible; moreover, the voltage difference between the target value of the base voltage and the actual output value of the base voltage can also be reduced, so that the base voltage output by the drive module matches FIG. 2 is a diagram illustrating the structure of a drive module according to an embodiment of the present disclosure. With reference to FIGS. 1 and 2, the drive module 200 provided by this embodiment of the present disclosure includes a mainboard 1, a power chip 2, and a driver chip 3. The driver chip 3 is electrically connected to the mainboard 1 and the power chip 2 respectively. The power chip 2 is configured to provide an analog reference voltage signal VCI to the driver chip 3. The mainboard 1 is configured to send a display mode control instruction to the driver chip 3. The driver chip 3 is configured to output multiple base voltages V1. The driver chip 3 includes a main control unit 4 and a base voltage generation unit 5. The main control unit 4 is configured to determine the current drive display mode according to the display mode control instruction and also configured to determine the target value of a base voltage V1 in the current drive display mode according to the current drive display mode, determine the optimal voltage multiplying relationship of the base voltage V1 in the current drive display mode according to the analog reference voltage signal VCI and the target value of the base voltage V1, calculate the actual output value of the base voltage V1 according to the analog reference voltage signal VCI and the optimal voltage multiplying relationship, and generate first instruction information including the actual output value. The base voltage generation unit 5 is configured to generate the corresponding base voltage V1 according to the first instruction information.

The drive module is composed of the mainboard 1, the driver chip 3 and the power chip 2. The driver chip 3 is electrically connected to the pixel circuits (not shown in the figure) in the display panel 100. The multiple base voltages V1 output by the driver chip 3 are transmitted to the pixel circuits, thereby controlling the light-emitting elements (not shown in the figure) in the pixel circuits to emit light. The base voltage signal output by the driver chip 3 is obtained by converting the analog reference voltage signal VCI provided by the power chip 2.

It is to be noted that in the present application, the drive module may adjust the selected voltage multiplying formula according to the actual display mode of the display device, thereby flexibly adjusting the actual output value of the base voltage V1.

In an embodiment, the mainboard 1 may generate a display mode control instruction based on the current display mode of the display device and transmit the display mode control instruction to the driver chip 3. After the main control unit 4 in the driver chip 3 acquires the display mode control instruction, the main control unit 4 determines the current display drive mode according to the display mode control instruction. In the current drive display mode, the display device may be driven to display in the current display mode.

It is to be understood that in different drive display modes, the required partial base voltages V1 have different target values. For example, in the high-power display mode HBN, some base voltages V1 are relatively large. In the normal display mode, some base voltages V1 are relatively small. For this reason, in this embodiment, after the current drive display mode is determined, the main control unit 4 may obtain the target value of the base voltage V1 corresponding to the current drive display mode.

Optionally, the main control unit 4 determines the optimal voltage multiplying relationship of the base voltage V1 according to the target value of the base voltage V1 and the voltage value of the analog reference voltage signal VCI provided by the power chip 2, calculates the actual output value of the base voltage V1 according to the optimal voltage multiplying relationship and the analog reference voltage signal VCI, and generates the corresponding first instruction information. The base voltage generation unit 5 in the driver chip 3 is electrically connected to the main control unit 4. A voltage conversion circuit (not shown in the figure) may be disposed in the base voltage generation unit 5. The base voltage generation unit 5 generates a base voltage V1 (including an actual output value) according to the first instruction information and outputs the base voltage V1 to the display panel.

The optimal voltage multiplying relationship is used to convert the analog reference voltage signal VCI into the base voltage V1 in the current drive display mode. Through the use of the optimal voltage multiplying relationship, on the basis of ensuring the normal display of the display device, the ratio of the analog reference voltage signal VCI to the actual output value of the base voltage V1 can be increased as much as possible, that is, the conversion efficiency of the base voltage V1 can be improved as much as possible; and moreover, the voltage difference between the target value of the base voltage V1 and the actual output value of the base voltage V1 can also be reduced, so that the base voltage V1 output by the drive module matches the current drive display mode, and further, the voltage loss is reduced and the overall power consumption of the display panel is reduced.

Table 2 is a comparison table of the actual output value of the base voltage of the drive module and the target value of the base voltage of the drive module provided for this embodiment of the present disclosure. With reference to and by comparing Table 1 and Table 2, in this embodiment, the target values of the basic voltages V1 in different drive display modes are the same as those in the related art. The difference is that, in this embodiment, in the high-power display mode HBN, the optimal voltage multiplying relationship of the analog power signal AVDD is selected to be AVDD=2VCI; and in the normal display mode, the optimal voltage multiplying relationship of the analog power signal AVDD is selected to be AVDD=VCI+VDDI, where VDDI denotes the power supply voltage provided by the mainboard 1 to driver chip 3. The value of the power supply voltage VDDI is generally between 1.65 V~1.95 V. In the present application, the power supply voltage VDDI may be set to 1.8 V. If the analog reference voltage signal VCI is 3.5 V, in the high-power display mode HBN, the actual output value of the analog power signal AVDD is 7 V, the conversion efficiency of the analog power signal AVDD is 3.5/7=0.5, the voltage difference between the actual output value of the analog power signal AVDD and the target value of the analog power signal AVDD is 7 V−5.4 V=1.6 V. In the normal display mode, the actual output value of the analog power signal AVDD is 5.3 V, the conversion efficiency of the analog power signal AVDD is 3.5/5.3≈0.66 (0.5 in the related art shown in Table 1), and the voltage difference between the actual output value of the analog power signal AVDD and the target value of the analog power signal AVDD is 5.3 V−5 V=0.3 V (1.6 V in the related art shown in Table 1). It can be seen that in the normal display mode, the conversion efficiency of the base voltage V1 is improved, and the voltage difference between the actual output value of the base voltage V1 and the target value of the base voltage V1 is reduced, thereby significantly reducing the power consumption of the display device.

TABLE 2

| Drive Display Mode | Target Value of a Basic Voltage | | | | | | | | Power Chip PVDD/PVEE | Driver Chip voltage multiplying relationship | PVDD/PVEE |
|---|---|---|---|---|---|---|---|---|---|---|---|
| | VGH | VGL | VREF | Vadta | VGMP | PVDD | PVEE | VCI | | | |
| HBM | 6 | −6 | −3.5 | 0~VGMP | 5.4 | 3.5 | −3.5 | 3.5 | 3.5/−3.5 | AVDD = 2VCI = 7<br>VCL = −VCI = −3.5<br>VGH = AVDD = 7<br>VGL = VCL = −3.5 | high resistance state |
| Normal | 6 | −6 | −3.5 | 0~VGMP | 5 | 3.3 | −3.3 | 3.5 | 3.3/−3.3 | AVDD = VCI + VDDI = 5.3<br>VCL = −2VCI = −7<br>VGH = AVDD + VDDI = 7.1<br>VGL = VCL = −7 | high resistance state |
| AOD1 | 6 | −6 | −3.1 | 0~VGMP | 5 | 3.3 | −3.1 | 3.5 | high resistance state | AVDD = VCI + VDDI = 5.3<br>VCL = −VCI = −3.5<br>VGH = AVDD + VDDI = 7.1<br>VGL = VCL − VCI = −7 | 3.3/−3.1 |

TABLE 2-continued

| Drive Display Mode | Target Value of a Basic Voltage | | | | | | | | Power Chip | Driver Chip | |
|---|---|---|---|---|---|---|---|---|---|---|---|
| | VGH | VGL | VREF | Vadta | VGMP | PVDD | PVEE | VCI | PVDD/PVEE | voltage multiplying relationship | PVDD/PVEE |
| AOD2 | 5 | −6.5 | −3.1 | 0~VGMP | 3.3 | 2.3 | −3.1 | 3.5 | high resistance state | AVDD = VCI = 3.5<br>VCL = −VCI = −3.5<br>VGH = AVDD + VDDI = 5.3<br>VGL = VCL − VCI = −7 | 2.3/−3.1 |

In addition, it is to be noted that the main control unit 4 prestores different analog reference voltage signals VCI, the target values of different base voltages V1, and the optimal voltage multiplying relationships corresponding to each analog reference voltage signal VCI and the target value of each base voltage V1 in different drive display modes and then selects the voltage multiplying relationship that best matches the current drive display mode after the analog reference voltage signal VCI and the target value of the base voltage V1 are determined. For the specific voltage multiplying relationship, this is not limited in this embodiment of the present disclosure. The preceding specific embodiment only exemplarily introduces the optimal voltage multiplying relationship used for the analog power signal AVDD, and the optimal voltage multiplying relationships of other base voltages V1 may be set by those skilled in the art according to actual requirements.

In this embodiment of the present disclosure, the drive module includes a mainboard, a power chip, and a driver chip. The driver chip is electrically connected to the mainboard and the power chip respectively. The power chip is configured to provide the analog reference voltage signal to the driver chip. The mainboard is configured to send the display mode control instruction to the driver chip. The driver chip is configured to output multiple base voltages. The driver chip includes a main control unit and a base voltage generation unit. The main control unit is configured to determine the current drive display mode according to the display mode control instruction and also configured to determine the target value of the base voltage in the current drive display mode according to the current drive display mode, determine the optimal voltage multiplying relationship of the base voltage in the current drive display mode according to the analog reference voltage signal and the target value of the base voltage, calculate the actual output value of the base voltage according to the analog reference voltage signal and the optimal voltage multiplying relationship, and generate the first instruction information including the actual output value. The base voltage generation unit is configured to generate the corresponding base voltage according to the first instruction information. Through the preceding solutions, on the basis of ensuring the normal display of the display device, the ratio of the analog reference signal to the actual output value of the base voltage can be increased as much as possible, that is, the conversion efficiency of the base voltage can be improved as much as possible; moreover, the voltage difference between the target value of the base voltage and the actual output value of the base voltage can also be reduced, so that the base voltage output by the drive module matches the current drive display mode, and further, the voltage loss is reduced and the overall power consumption of the display panel is reduced.

Optionally, in a possible embodiment, the optimal voltage multiplying relationship includes a preset voltage multiplying relationship and an optimal voltage multiplying coefficient under the preset voltage multiplying relationship. The main control unit 4 is also configured to determine an optimal voltage multiplying coefficient of a base voltage V1 under a preset voltage multiplying relationship in the current drive display mode according to the analog reference voltage signal VCI and the target value of the base voltage V1 and calculates the actual output value of the base voltage V1 according to the analog reference voltage signal VCI, the preset voltage multiplying relationship, and the optimal voltage multiplying coefficient.

In an embodiment, in a general setting, in different drive display modes, the optimal voltage multiplying relationship of the base voltage V1 includes a same voltage multiplying relationship which is the preset voltage multiplying relationship. The voltage multiplying coefficient of the preset voltage multiplying relationship is adjusted, so that the optimal voltage multiplying relationship corresponding to the base voltage V1 in different drive display modes can be obtained. Generally speaking, in different drive display modes, the optimal voltage multiplying relationship of a certain base voltage V1 can be obtained by multiplying a preset voltage multiplying relationship by different optimal voltage multiplying coefficients.

The main control unit 4 may prestore analog reference voltage signals VCI, the target values of base voltages V1, the preset voltage multiplying relationship, and different voltage multiplying coefficients in different drive display modes. After the current display drive mode is determined, the main control unit 4 may determine the optimal voltage multiplying coefficient of the base voltage V1 in the preset voltage multiplying relationship according to the target value of the base voltage V1 and the voltage value of the analog reference voltage signal VCI, calculate the actual output value of the base voltage V1 according to the preset voltage multiplying relationship, the optimal voltage multiplying coefficient, and the analog reference voltage signal VCI, and generate the corresponding first instruction information.

For example, in a possible embodiment, the preset voltage multiplying relationship of the base voltage V1 includes $V1=m*VCI+n*VDDI$. VCI denotes the analog reference voltage signal. VDDI denotes the power supply voltage received by the driver chip 3. m and n denote voltage multiplying coefficients. m and n are integers.

In an embodiment, V1 denotes the base voltage, and the preset voltage multiplying relationship of the base voltage V1 may be $V1=m*VCI+n*VDDI$. m and n denote voltage multiplying coefficients. m and n are integers.

In a general setting, each base voltage V1 may be represented by the analog reference voltage signal VCI and the power supply voltage VDDI. For example, the optimal voltage multiplying relationship of the analog power signal AVDD mentioned in the preceding embodiment in the high-power display mode HBN is AVDD=2VCI. It can be regarded that the voltage multiplying coefficient m is 2, and n is 0. The optimum voltage multiplying relationship of the analog power signal AVDD in the normal display mode is AVDD=VCI+VDDI. It can be regarded that the voltage multiplying coefficient m is 1, and n is 1.

In this embodiment, V1=m*VCI+n*VDDI may be used as the preset voltage multiplying relationship. When the drive display mode changes, the actual output value of the optimal base voltage V1 in the current drive display mode can be calculated by selecting a corresponding optimal voltage multiplying coefficient.

Optionally, multiple base voltages may include an analog power voltage AVDD, a VCL voltage, a high-level voltage VGH, and a low-level voltage VGL. The drive display mode includes a high-power display mode HBN, a normal display mode, and at least one Always on Display mode AOD.

The preceding base voltages are described in the preceding embodiment, and the details are not repeated here. The drive display modes may be divided into a high-power display mode HBN, a normal display mode, and at least one Always on Display mode AOD. The value of the base voltage required in the high-power display mode HBN is generally the largest, the value of the base voltage in the normal display mode takes second place, and the value of the base voltage in the Always on Display mode AOD is generally the minimum. The types of Always on Display modes AOD are also different according to different actual application requirements, and there are fine differences in power consumption in different Always on Display modes AOD. In this embodiment, at least one Always on Display mode AOD may be included in the drive display mode.

In different drive display modes, the value of at least one of the preceding analog power voltage AVDD, VCL voltage, high-level voltage VGH, or low-level voltage VGL is different.

For example, in a possible embodiment, the preset voltage multiplying relationship of each base voltage may be set in the following manner. For example, the preset voltage multiplying relationship of the analog power voltage AVDD may include AVDD=a*VCI+b*VDDI. The preset voltage multiplying relationship of the VCL voltage may include VCL=−c*VCI. The preset voltage multiplying relationship of the high-level voltage VGH may include VGH=d*AVDD+e*VCI. The preset voltage multiplying relationship of the low-level voltage VGL may include VGL=f*VCL−g*VCI−h*AVDD. VCI denotes the analog reference voltage signal VCI. VDDI denotes the power supply voltage VDDI received by the driver chip 3. a, b, c, d, e, f, g, and h are voltage multiplying coefficients. a, b, c, d, e, f, g, and h are natural numbers.

The source of the analog power voltage AVDD is the analog reference voltage signal VCI and the power supply voltage VDDI. In different drive display modes, the voltage multiplying coefficients a and/or b in the preset voltage multiplying relationship AVDD=a*VCI+b*VDDI of the analog power voltage AVDD may be different.

The source of the VCL voltage is the analog reference voltage signal VCI. In different drive display modes, the voltage multiplying coefficient c in the preset voltage multiplying relationship VCL=−c*VCI of the VCL voltage may be different.

The source of the high-level voltage VGH is the analog power voltage AVDD and the analog reference voltage signal VCI. In different drive display modes, the voltage multiplying coefficients d and/or e in the preset voltage multiplying relationship VGH=d*AVDD+e*VCI of the high-level voltage VGH may be different.

The source of the low-level voltage VGL is the VCL voltage, the analog power voltage AVDD, and the analog reference voltage signal VCI. In different drive display modes, the voltage multiplying coefficients f, g, and/or h in the preset voltage multiplying relationship VGL=f*VCL−g*VCI−h*AVDD of the low-level voltage VGL may be different.

It is to be understood that each preceding preset voltage multiplying relationship includes the symbol of each voltage. Thus, the voltage multiplying coefficients in the preset voltage multiplying relationship should include 0 and positive integers. The specific set values of the preceding voltage multiplying coefficients may be set by the skilled in the art according to actual requirements, and this is not limited in this embodiment of the present disclosure.

For example, in this embodiment of the present application, the voltage multiplying coefficient a in the preset voltage multiplying relationship of the analog power voltage AVDD may be 1 or 2, and b may be 0 or 1, but this embodiment is not limited thereto. When a and b are the preceding values, the voltage multiplying relationship of the analog power voltage AVDD may be AVDD=VCI, AVDD=VCI+VDDI, AVDD=2VCI, and AVDD=2VCI+VDDI, but this embodiment is not limited thereto.

The voltage multiplying coefficient c in the preset voltage multiplying relationship of the VCL voltage may be 1 or 2, but this embodiment is not limited thereto. When c is the preceding value, the voltage multiplying relationship of the VCL voltage may include VCL=−VCI and VCL=−2VCI, but this embodiment is not limited thereto.

The voltage multiplying coefficient d in the preset voltage multiplying relationship of the high-level voltage VGH may be 1, and e may be 0 or 1, but this embodiment is not limited thereto. When d and e are the preceding values, the voltage multiplying relationship of the high-level voltage VGH may include VGH=AVDD, AVDD=AVDD+VCI, and AVDD=2AVDD, but this embodiment is not limited thereto.

The voltage multiplying coefficient f in the preset voltage multiplying relationship of the low-level voltage VGL may be 1 or 2, g may be 0 or 1, and h may be 0 or 1, but this embodiment is not limited thereto. When f, g, and h are the preceding values, the voltage multiplying relationship of the low-level voltage VGL may include VGL=VCL, VGL=VCL−VCI, and VGL=VCL−AVDD, but this embodiment is not limited thereto.

A point to be noted is that the preset voltage multiplying relationship of the high-level voltage VGH and the preset voltage multiplying relationship of the low-level voltage VGL in the base voltage include other base voltages (the analog power voltage AVDD and the VCL voltage), and the analog power voltage AVDD and the VCL voltage may be converted from the analog reference voltage signal VCI and the power supply voltage VDDI. Thus, the preset voltage multiplying relationship of each base voltage in this embodiment is substantially the same as the preset voltage multiplying relationship V1=m*VCI+n*VDDI of the base voltage in the preceding embodiment, and there is no contradiction between the two. This embodiment only further refines the preset voltage multiplying relationship for each of the different types of base voltages.

Optionally, the mainboard 1 may also be configured to provide the power supply voltage VDDI to the driver chip 3. The mainboard 1 may include a battery unit (not shown in the figure). The battery unit on the mainboard 1 provides the power supply voltage VDDI to the driver chip 3. Moreover, the mainboard 1 may also provide a battery voltage VBAT to the power chip 2. Then, the voltage conversion circuit in the power chip 2 converts the battery voltage VBAT into the analog reference voltage signal VCI and outputs the analog reference voltage signal VCI.

Optionally, in a possible embodiment, the actual output value of the base voltage V1 in the current drive mode is larger than or equal to the target value.

According to the above-described embodiment, the target value of the base voltage V1 may be the minimum value of the base voltage V1 when the drive display mode is implemented. Thus, to ensure that the display device operates normally in the current drive display mode, the actual output value in the current drive display mode may be made not smaller than the target value of the base voltage V1. On this basis, the preset voltage multiplying relationship is selected. That is, in this embodiment, on the basis of ensuring that the actual output value of the base voltage V1 is larger than or equal to the target value of the base voltage V1, the actual output value is as close as possible to the target value. Further, the system power consumption is reduced while the drive requirement of the current drive display mode is implemented.

In the preceding embodiment, the actual output value closer to the target value of the base voltage V1 may be obtained by selecting an appropriate voltage multiplying relationship, so that the voltage difference is reduced, thereby implementing the low power consumption. In other possible embodiments, the voltage multiplying relationship and the analog reference voltage signal VCI are adjusted at the same time to further improve the conversion efficiency of the base voltage V1, thereby reducing the overall power consumption of the display device.

Figure 3:
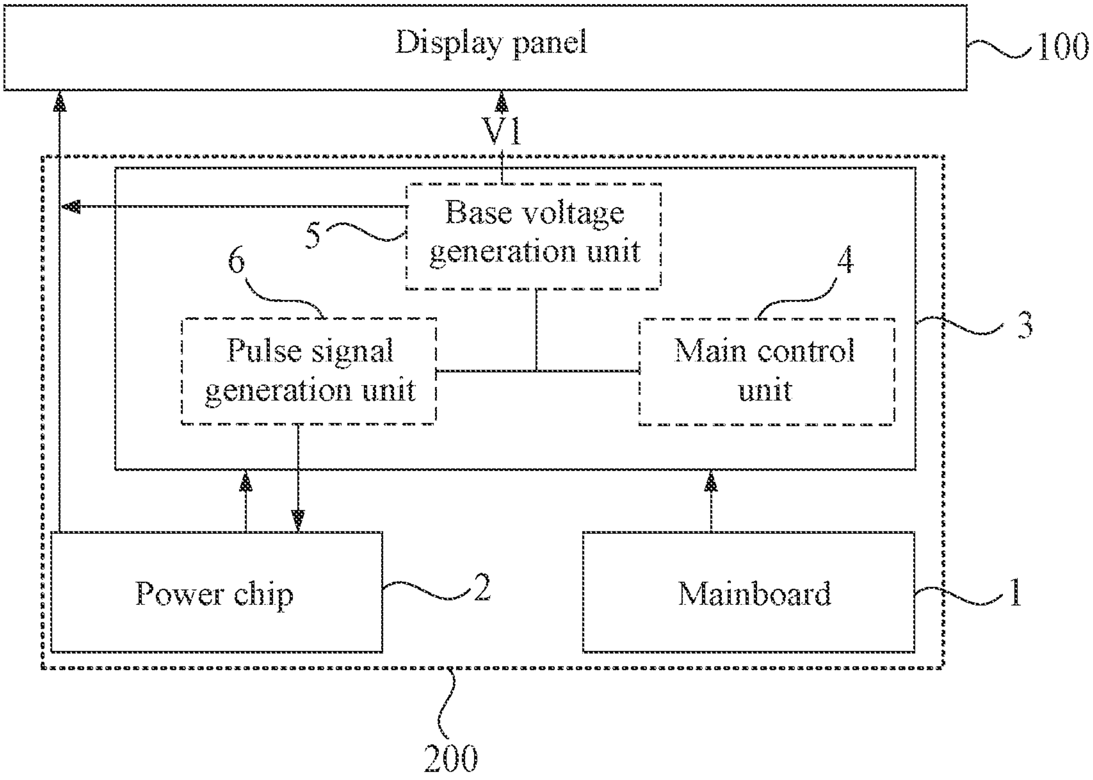
FIG. 3 is a diagram illustrating the structure of another drive module according to an embodiment of the present disclosure.

For example, FIG. 3 is a diagram illustrating the structure of another drive module according to an embodiment of the present disclosure. With reference to FIG. 3, in a possible embodiment, the driver chip 3 also includes a pulse signal generation unit 6. The pulse signal generation unit 6 is electrically connected to the main control unit 4 and the power chip 2 respectively. The main control unit 4 is also configured to determine an optimal analog reference voltage signal VCI according to the current drive display mode and generate second instruction information including the optimal analog reference voltage signal VCI. The pulse signal generation unit 6 is configured to generate a corresponding first pulse signal according to the second instruction information. The power chip 2 is configured to generate the corresponding optimal analog reference voltage signal VCI according to the first pulse signal and output the optimal analog reference voltage signal VCI to the driver chip 3. The main control unit 4 is also configured to determine the optimal voltage multiplying relationship of the base voltage V1 in the current drive display mode according to the optimal analog reference voltage signal VCI and the target value of the base voltage V1 and calculate the actual output value of the base voltage V1 according to the optimal analog reference voltage signal VCI and the optimal voltage multiplying relationship to generate the first instruction information including the actual output value.

Since the conversion efficiency of the base voltage V1 is the ratio of an analog reference voltage value to the actual output value of the base voltage V1, the analog reference voltage signals VCI in different drive display modes are adjusted so that an analog reference voltage signal VCI matches the current drive display mode, and it may play a positive role in improving the conversion efficiency of the base voltage V1. In addition, the analog reference voltage signal VCI output by the power chip 2 is provided by the battery unit (not shown in the figure). For the power chip 2, the battery voltage VBAT provided by the battery unit is input, and the analog reference voltage signal VCI is output. The conversion efficiency of the analog reference voltage signal VCI is the ratio of the battery voltage VBAT to the analog reference voltage signal VCI. In general, the battery voltage VBAT is a fixed value. Thus, the adjustment of the analog reference voltage signals VCI of different drive display modes are also conductive to the improvement of the conversion efficiency of the analog reference voltage signal VCI of the power chip 2.

In an embodiment, after the main control unit 4 determines the current drive display mode, the main control unit 4 may determine the optimal analog reference voltage signal VCI in the current drive display mode and generate the second instruction information based on the optimal analog reference voltage signal VCI. The second instruction information is transmitted by the main control unit 4 to the pulse signal generation unit 6. The pulse signal generation unit 6 may generate the corresponding first pulse signal according to the received second instruction information. The first pulse signal corresponds to the optimal analog reference voltage signal VCI.

Optionally, the first pulse signal is transmitted to the power chip 2 by the pulse signal generation unit 6. The power chip 2 may parse the first pulse signal to determine the value of the optimal analog reference voltage signal VCI in the current drive display mode and output the value.

Optionally, the power chip 2 may be electrically connected to the base voltage generation unit 5 and the main control unit 4 respectively. The optimal analog reference voltage signal VCI output by the power chip 2 is transmitted to the base voltage generation unit 5 and the main control unit 4 in the driver chip 3. At this time, the main control unit 4 of the driver chip 3 may select an optimal voltage multiplying relationship according to the optimal analog reference voltage signal VCI and the target value of the base voltage V1, calculate the actual output value of the base voltage V1 according to the optimal analog reference voltage signal VCI and the optimal voltage multiplying relationship, and output the first instruction information. The base voltage generation unit 5 outputs the base voltage V1 according to the optimal voltage multiplying relationship on the basis of the optimal analog reference voltage signal VCI.

In this embodiment, the drive module may generate the optimal analog reference voltage signal VCI corresponding to the current drive display mode according to the current drive display mode and can simultaneously improve the conversion efficiency of the analog reference voltage signal VCI at the power chip 2 and the conversion efficiency of the base voltage V1 at the driver chip 3, thereby further reducing the waste of the power consumption of the display device and reducing the overall power consumption.

For example, Table 3 is another comparison table of the actual output value of the base voltage and the target value of the base voltage provided for this embodiment of the present disclosure. With reference to and by comparing Table 1 and Table 3, in this embodiment, the values of the optimal analog reference voltage signals VCI in the high-power display mode HBN, the normal display mode, the first Always on Display mode AOD1, and the second Always on Display mode AOD2 are 3.5 V, 3.4 V, 3.4 V, and 3.5 V respectively. Compared with the analog reference voltage signals VCI of 3.3 V in different drive display modes in the related art, the conversion efficiency of analog reference voltage signals VCI are improved.

TABLE 3

| Drive | | | | | | | | | Power Chip | Driver Chip | |
|---|---|---|---|---|---|---|---|---|---|---|---|
| Display | Target Value of a Basic Voltage | | | | | | | | PVDD/ | voltage multiplying | PVDD/ |
| Mode | VGH | VGL | VREF | Vadta | VGMP | PVDD | PVEE | VCI | PVEE | relationship | PVEE |
| HBM | 6 | −6 | −3.5 | 0~VGMP | 5.4 | 3.5 | −3.5 | 3.5 | 3.5/−3.5 | AVDD = 2VCI = 7<br>VCL = −VCI = −3.5<br>VGH = AVDD = 7<br>VGL = VCL = −3.5 | high resistance state |
| Normal | 6 | −6 | −3.5 | 0~VGMP | 5 | 3.3 | −3.3 | 3.4 | 3.3/ −3.3 | AVDD = VCI + VDDI = 5.2<br>VCL = −2VCI = −6.8<br>VGH = AVDD + VDDI = 7<br>VGL = VCL = −6.8 | high resistance state |
| AOD1 | 6 | −6 | −3.1 | 0~VGMP | 5 | 3.3 | −3.1 | 3.4 | high resistance state | AVDD = VCI + VDDI = 5.2<br>VCL = −VCI = −3.4<br>VGH = AVDD + VDDI = 7<br>VGL = VCL − VCI = −6.8 | 3.3/−3.1 |
| AOD2 | 5 | −6.5 | −3.1 | 0~VGMP | 3.3 | 2.3 | −3.1 | 3.5 | high resistance state | AVDD = VC I = 3.5<br>VCL = −VCI = −3.5<br>VGH = AVDD + VDDI = 5.3<br>VGL = VCL − VCI = −7 | 2.3/−3.1 |

With continued reference to FIG. 3, in the high-power display mode HBN, the optimal voltage multiplying relationship of the analog power voltage AVDD is AVDD=2VCI=7 V, the optimal voltage multiplying relationship of the VCL voltage is VCL=−VCI=−3.5 V, the optimal voltage multiplying relationship of the high-level voltage VGH is VGH=AVDD=7 V, and the optimal voltage multiplying relationship of the low-level voltage VGL is VGL=VCL=−7 V. Compared with the related art shown in Table 1, the conversion efficiency of the VCL voltage is greatly improved.

In the normal display mode, the optimal voltage multiplying relationship of the analog power voltage AVDD is AVDD=VCI+VDDI=5.2 V, the optimal voltage multiplying relationship of the VCL voltage is VCL=−2VCI=−6.8 V, the optimal voltage multiplying relationship of the high-level voltage VGH is VGH=AVDD+VDDI=7 V, and the optimal voltage multiplying relationship of the low-level voltage VGL is VGL=VCL=−6.8 V. Compared with the related art shown in Table 1, the conversion efficiency of the analog power voltage AVDD is greatly improved.

In the first Always on Display mode AOD1, the optimal voltage multiplying relationship of the analog power voltage AVDD is AVDD=VCI+VDDI=5.2 V, the optimal voltage multiplying relationship of the VCL voltage is VCL=−VCI=−3.4 V, the optimal voltage multiplying relationship of the high-level voltage VGH is VGH=AVDD+VDDI=7 V, and the optimal voltage multiplying relationship of the low-level voltage VGL is VGL=VCL−VCI=−6.8 V. Compared with the related art shown in Table 1, the conversion efficiency of the analog power voltage AVDD is greatly improved.

In the second Always on Display mode AOD2, the optimal voltage multiplying relationship of the analog power voltage AVDD is AVDD=VCI=3.5 V, the optimal voltage multiplying relationship of the VCL voltage is VCL=−VCI=−3.5 V, the optimal voltage multiplying relationship of the high-level voltage VGH is VGH=AVDD+VDDI=5.3 V, and the optimal voltage multiplying relationship of the low-level voltage VGL is VGL=VCL−VCI=−7 V. Compared with the related art shown in Table 1, the conversion efficiency of the analog power voltage AVDD, the high-level voltage VGH, and the low-level voltage VGL is greatly improved.

This embodiment of the present disclosure does not limit the specific manner in which the power chip 2 generates the optimal analog reference voltage signal VCI according to the first pulse signal, and those skilled in the art may set according to actual requirements. For example, the power chip 2 may generate the corresponding optimal analog reference voltage signal VCI according to the number of consecutive pulses of the first pulse signal and/or the duty cycle of the first pulse signal in each of different drive display modes.

Figure 4:
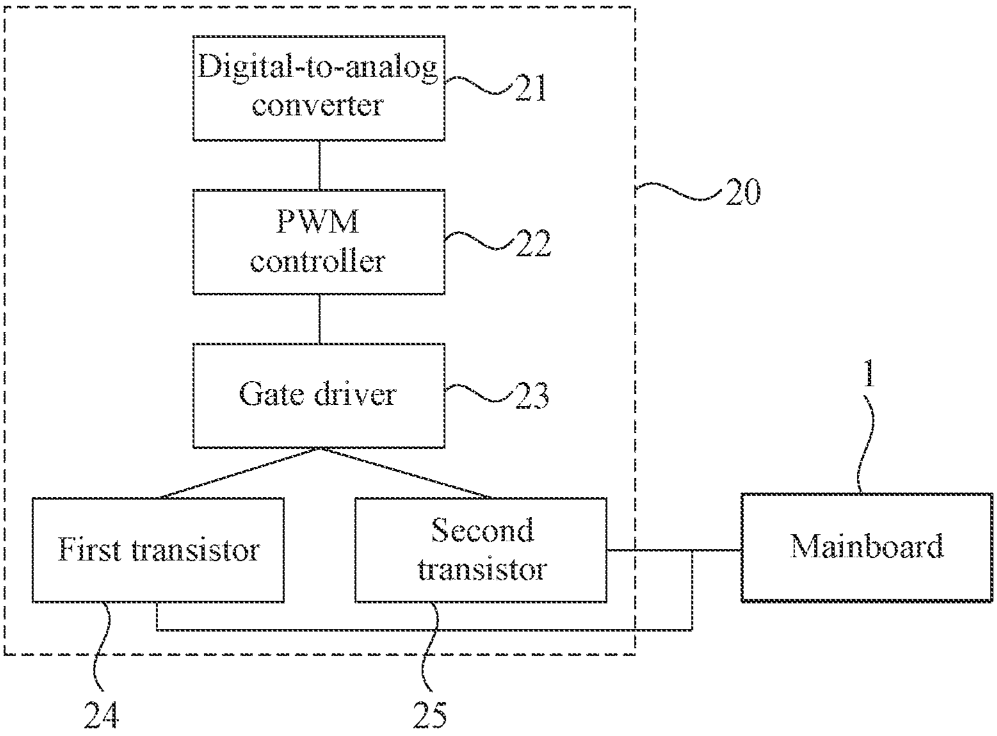
FIG. 4 is a diagram illustrating the structure of an analog reference voltage signal generation unit according to an embodiment of the present disclosure.

For example, an optional generation method of the optimal analog reference voltage signal VCI is described below. The power chip 2 may include an analog reference voltage signal generation unit. The analog reference voltage signal generation unit is electrically connected to the driver chip 3. FIG. 4 is a diagram illustrating the structure of an analog reference voltage signal generation unit according to an embodiment of the present disclosure. With reference to FIG. 4, the analog reference voltage signal generation unit 20 may include a digital-to-analog converter 21, a PWM controller 22, a gate driver 23, a first transistor 24, and a second transistor The PWM controller 22 is connected to the digital-to-analog converter 21. The gate driver 23 is connected to the PWM controller 22. The gate of the first transistor 24 is connected to the gate driver 23. The gate of the second transistor 25 is connected to the gate driver 23. A first electrode of the first transistor 24 and a second electrode of the second transistor 25 are connected to the mainboard 1 respectively. A second electrode of the first transistor 24 is grounded (not shown in the figure). A first electrode of the second transistor 25 is electrically connected to the signal output terminal of the analog reference voltage signal generation unit 20 (not shown in the figure).

The digital-to-analog converter 21 is configured to convert a pulse signal in a digital form into a pulse signal in an analog form. The PWM controller 22 is configured to generate a pulse signal having the corresponding duty cycle based on the pulse signal in the analog form. The gate driver 23 is configured to control the first transistor 24 and the second transistor 25 to be turned on alternately according to the pulse signal having the corresponding duty cycle to output the corresponding optimal analog reference voltage signal VCI. In this configuration, the number of consecutive pulses of first pulse signals in different drive display modes may be different. Of course, the preceding embodiment is only an example. In an actual application process, the generation method of the optimal analog reference voltage signal VCI is not limited thereto.

A point to be noted is that since the voltage multiplying methods of some base voltages involve additional base voltages, for example, the analog power voltage AVDD is included in the preset voltage multiplying relationship VGH=d*AVDD+e*VCI of the high-level voltage VGH, in different drive display modes, after the optimal voltage multiplying relationship of a certain base voltage is selected, the optimal voltage multiplying relationships of other related base voltages may be adaptively adjusted, so that the actual output values of all base voltages can satisfy their respective required target values, thereby ensuring that display device operates normally.

For example, with continued reference to Table 3, in the high-power display mode HBN, the voltage multiplying method of the analog power voltage AVDD is AVDD=2VCI=7 V, and the voltage multiplying method of the high-level voltage VGH is VGH=AVDD=7 V. In this drive display mode, the target value of the maximum gray-scale voltage is 5.4 V, and the target value of the high-level voltage VGH is 6 V. The actual output value of the analog power voltage AVDD and the actual output value of the high-level voltage signal VGH satisfy actual requirements. In the normal display mode, the voltage multiplying method of the analog power voltage AVDD is adjusted to AVDD=VCI+VDDI=5.2 V. At this time, if the voltage multiplying method of the high-level voltage VGH is still VGH=AVDD, the actual output value of the high-level voltage VGH is 5.2 V. However, the target value of the high-level voltage VGH is still 6 V, the actual output value of the high-level voltage VGH cannot satisfy the target value, which will affect the normal display of the display device. For this reason, in the present application, when the voltage multiplying method of the analog power voltage AVDD is changed, the voltage multiplying method of the high-level voltage VGH may be adjusted to VGH=AVDD+VDDI accordingly. At this time, the actual output value of the high-level voltage VGH is 7 V>6 V, which satisfies actual voltage requirements. The display device can operate in the normal display mode.

Thus, after the corresponding optimal voltage multiplying methods are selected for partial base voltages in some drive display modes in Table 3, the conversion efficiency of the partial base voltages will decrease slightly (compared with Table 1). However, the overall conversion efficiency of the driver chip 3 is improved in view of all the base voltages. For example, in the normal display mode, in the related art, the conversion efficiency of the analog power voltage AVDD, the VCL voltage, the high-level voltage VGH, and the low-level voltage VGL is 3.3 V/6.6 V=0.5%. In this embodiment of the present application, the conversion efficiency of the analog power voltage AVDD is 3.4 V/5.2 V=0.65% (0.15% higher than the related art). The conversion efficiency of the VCL voltage is 3.4 V/6.8 V=0.5% (equal to the related art). The conversion efficiency of the high-level voltage VGH is 3.4 V/7V≈0.49% (0.01% lower than the related art). The conversion efficiency of the low-level voltage VGL is 3.4 V/6.8 V=0.5% (equal to the related art). The overall conversion efficiency of the base voltages increases by about 0.14% compared with the related art.

In addition, it can be seen from the preceding embodiment that when the optimal voltage multiplying relationship of each base voltage is selected, the conversion efficiency of some base voltages may increase, but the conversion efficiency of some other base voltages may decrease. For this reason, the preferred determination of the optimal voltage multiplying relationship of which base voltage may also affect the total power consumption of the final display device.

In this embodiment of the present application, when the optimal voltage multiplying relationship of each base voltage is selected, the degree of influence of the base voltage on the power consumption of the display panel may be considered to determine the preferred base voltage. In general, the larger the power consumption waste caused by the voltage difference between the target value of the base voltage and the actual output value of the base voltage is, the higher the importance of the base voltage is. The main control unit 4 may store the importance of each base voltage. After the current drive display mode is determined, the main control unit 4 determines the optimal voltage multiplying relationship of each base voltage in the current drive display mode according to the analog reference voltage signal VCI, the target value of each base voltage, and the determined actual output value of a base voltage in sequence in accordance with the importance of each base voltage. In other words, that is, the optimal voltage multiplying relationship of the base voltage of higher importance is first determined according to the target value of the base voltage of higher importance, actual output value of the base voltage of higher importance, and determined analog reference signal of higher importance, and then the optimal voltage multiplying relationship of the base voltage of lower importance is determined according to the target value of the base voltage of lower importance, actual output value of the base voltage of lower importance, and determined analog reference signal of lower importance.

For example, in the preceding base voltage, the analog power voltage AVDD is used to supply power to data lines, and the current of the analog power voltage AVDD is large. The power consumption caused by the voltage difference between the actual output value and the target value is large, followed by the VCL voltage, then the high-level voltage VGH, and finally the low-level voltage VGL. That is, the order of the importance of the preceding base voltages is the analog power voltage AVDD>the VCL voltage>the high-level voltage VGH>the low-level voltage VGL. The main control unit 4 may sequentially determine the optimal voltage multiplying relationship of each base voltage according to the preceding order of the importance, thereby reducing the total voltage difference of the base voltage as much as possible, and improving the overall conversion efficiency of the base voltage.

Optionally, with continued reference to FIGS. 1 and 3, in a possible embodiment, the main control unit 4 may also be configured to determine a power supply voltage according to the current drive display mode, generate third instruction information including the power supply voltage, and send the third instruction information to the pulse signal generation unit 6 or the base voltage generation unit 5. The pulse signal generation unit 6 is also configured to generate a corresponding second pulse signal according to the third instruction information. The power chip 2 is also configured to generate and output the corresponding power supply voltage according to the second pulse signal. The base voltage generation unit 5 is also configured to generate the power supply voltage according to the third instruction information and the optimal analog reference voltage signal VCI and output the power supply voltage.

The power supply voltage may include a positive power supply voltage PVDD and a negative power supply voltage PVEE. The power supply voltage is used to provide a drive voltage to pixel circuits. The power supply voltage may be provided by the power chip 2 or the driver chip 3.

In this embodiment, the main control unit 4 may also determine the power supply voltage required for the display panel in the current drive display mode according to the current drive display mode. In general, the target value of the power supply voltage in the high-power display mode HBN and the target value of the power supply voltage in the normal display mode are relatively large, and the target value of the power supply voltage in the Always on Display mode AOD is relatively small. After the power supply voltage required in the current drive display mode is determined, the main control unit 4 may generate the corresponding third instruction information and send the third instruction information to the pulse signal generation unit 6 or the base voltage generation unit 5.

When the power supply voltage is provided by the power chip 2, the pulse signal generation unit 6 in the driver chip 3 may generate the corresponding second pulse signal after receiving the third instruction information, and then the power chip 2 may generate the corresponding power supply voltage according to the second pulse signal and output the corresponding power supply voltage to the display panel.

When the power supply voltage is provided by the driver chip 3, since the source of the base voltage output by the driver chip 3 is the analog reference voltage signal VCI, the base voltage generation module in the driver chip 3 may generate the corresponding power supply voltage according to the third instruction information and the optimal analog reference voltage signal VCI in the current drive display mode after receiving the third instruction information and output the corresponding power supply voltage to the display panel.

With continued reference to Table 3, in the high-power display mode HBN, the positive power supply voltage PVDD and the negative power supply voltage PVEE are 3.5 V and −3.5 V respectively. In the normal display mode, the positive power supply voltage PVDD and the negative power supply voltage PVEE are 3.3 V and −3.3 V respectively. In the first Always on Display mode AOD1, the positive power supply voltage PVDD and the negative power supply voltage PVEE are 3.3 V and −3.1 V respectively. In the second Always on Display mode AOD2, the positive power supply voltage PVDD and the negative power supply voltage PVEE are 2.3 V and −3.1 V respectively. It can be seen that relatively speaking, the power supply voltage values required for the display panel in the high-power display mode HBN and the normal display mode are relatively large, and the power supply voltage value required for the display panel in the Always on Display mode AOD is relatively small. The voltage signal source of the power chip 2 is the battery unit, and the voltage signal source of the driver chip 3 is mostly the power chip 2. Thus, in an optional embodiment, in the high-power display mode HBN or the normal display mode, the power chip 2 may be configured to generate and output a power supply voltage signal. In the Always on Display mode AOD, the driver chip 3 generates and outputs the power supply voltage. That is, when the target value of the power supply voltage is large, the power chip 2 provides the power supply voltage. When the target value is small, the driver chip 3 provides the power supply voltage.

Figure 5:
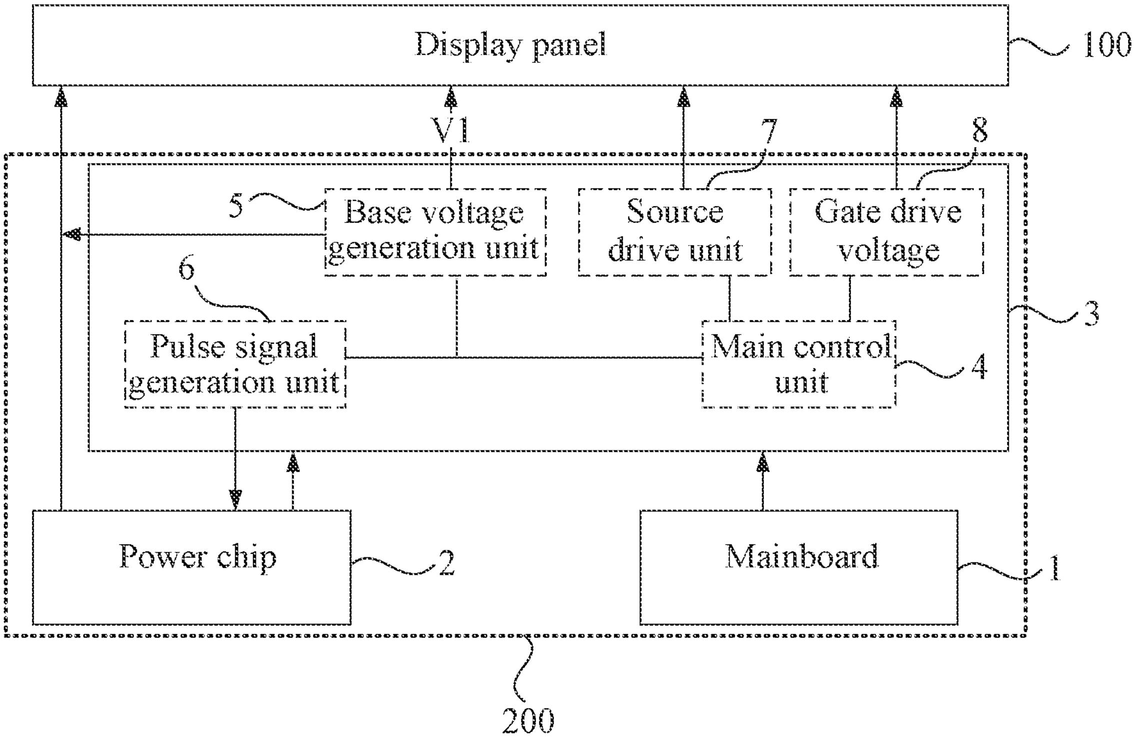
FIG. 5 is a diagram illustrating the structure of another drive module according to an embodiment of the present disclosure.

Optionally, FIG. 5 is a diagram illustrating the structure of another drive module according to an embodiment of the present disclosure. With reference to FIG. 5, in a possible embodiment, the driver chip 3 also includes a source drive unit 7 and a gate drive unit 8. The source drive unit 7 and the gate drive unit 8 are electrically connected to the main control unit 4 respectively. The main control unit 4 is configured to generate fourth instruction information including a source drive voltage. The source drive unit 7 is configured to generate the corresponding source drive voltage according to the fourth instruction information. The main control unit 4 is configured to generate fifth instruction information including a gate drive voltage. The gate drive unit 8 is configured to generate the corresponding gate drive voltage according to the fifth instruction information.

In an embodiment, as shown in FIG. 5, the driver chip 3 is provided with the source drive unit 7 and the gate drive unit 8. The input terminal of the source drive unit 7 and the input terminal of the gate drive unit 8 are electrically connected to the main control unit 4 respectively. The output terminal of the source drive unit 7 and the output terminal of the gate drive unit 8 are electrically connected to the pixel circuits (not shown in the figure) in the display panel 100 respectively.

The source drive unit 7 may generate the corresponding source drive voltage according to the fourth instruction information transmitted by the main control unit 4 and transmit the source drive voltage to the pixel circuits. The gate drive unit 8 may generate the corresponding gate drive voltage according to the fifth instruction information transmitted by the main control unit 4 and then transmit the gate drive voltage to the pixel circuits. It is to be known by those skilled in the art that multiple light-emitting elements and multiple transistors (such as 2T1C pixel circuit or 7T1C pixel circuit) are disposed in the pixel circuits, and that the gate drive voltage and the source drive voltage jointly control the operating state of the pixel circuits to implement the display of the display panel. The gate drive unit 8 may be connected to the pixel circuits through a shift register.

The specific configuration method of the source drive unit 7 and the gate drive unit 8 and the connection between each of the source drive unit 7 and the gate drive unit 8 and the pixel circuits may be designed by those skilled in the art according to actual requirements. This is not limited in this embodiment of the present disclosure, and the details are not repeated here.

Figure 6:
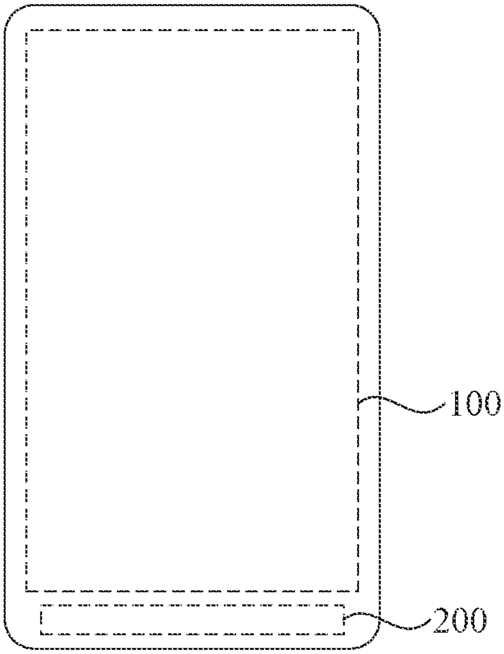
FIG. 6 is a view illustrating the structure of a display device according to an embodiment of the present disclosure.

An embodiment of the present disclosure provides a display device. FIG. 6 is a view illustrating the structure of a display device according to an embodiment of the present disclosure. As shown in FIG. 6, the display device includes the drive module 200 according to any embodiment of the present disclosure. The drive module 200 is configured to provide a drive signal to the display panel 100 in the display device. The display device provided by this embodiment of the present disclosure includes the drive module 200 of any embodiment of the present disclosure, has the technical features of the drive module 200 provided by any embodiment of the present disclosure, and has the same or corresponding beneficial effects of the drive module 200 included in the display device, and the details are not repeated here.

Figure 7:
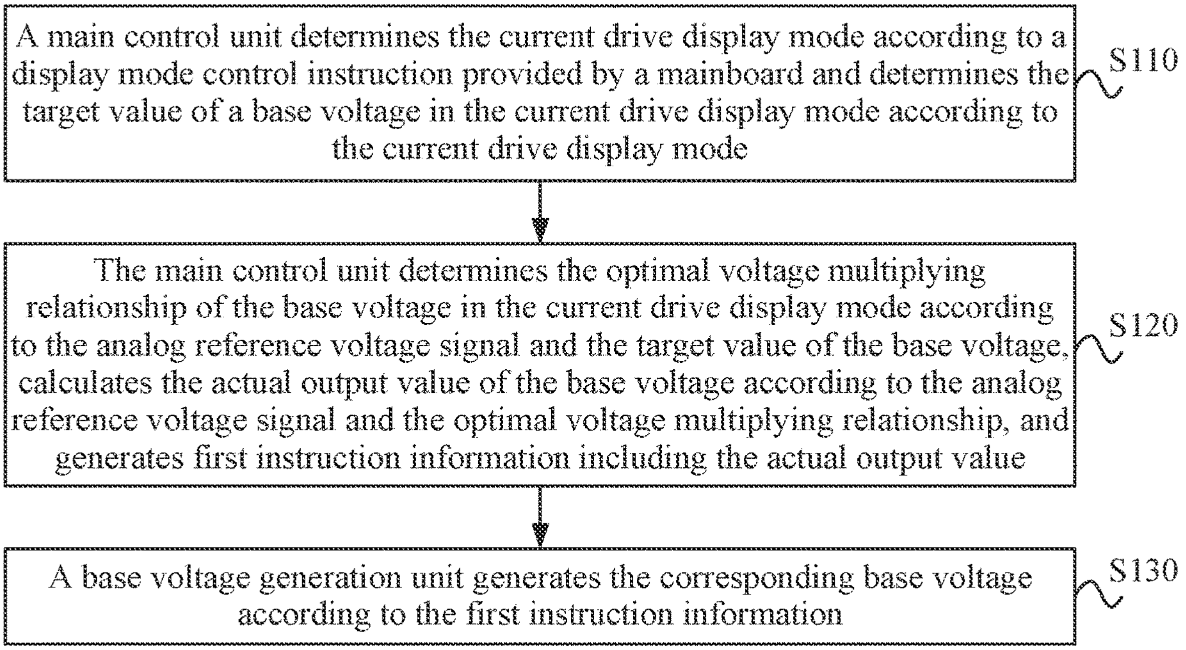
FIG. 7 is a flowchart of a voltage generation method of a drive module according to an embodiment of the present disclosure.

Based on the same concept, an embodiment of the present disclosure provides a voltage generation method of a drive module. For the configuration method of the drive module 200, reference may be made to any of the preceding embodiments. In an embodiment, as shown in FIG. 2, the drive module 200 includes a mainboard 1, a power chip 2, and a driver chip 3. The driver chip 3 is electrically connected to the mainboard 1 and the power chip 2 respectively. The driver chip 3 includes a main control unit 4 and a base voltage generation unit 5. The power chip 2 is configured to provide the analog reference voltage signal VCI to the driver chip 3. The mainboard 1 is configured to send the display mode control instruction to the driver chip 3. The driver chip 3 is configured to output multiple base voltages V1. FIG. 7 is a flowchart of a voltage generation method of a drive module according to an embodiment of the present disclosure. With continued reference to FIGS. 1, 2, and 7, the voltage generation method includes the steps below.

In S110, the main control unit determines the current drive display mode according to the display mode control instruction provided by the mainboard and determines the target value of the base voltage in the current drive display mode according to the current drive display mode.

In an embodiment, the mainboard 1 may generate the display mode control instruction based on the current display mode of the display device and transmit the display mode control instruction to the driver chip 3. After the main control unit 4 in the driver chip 3 acquires the display mode control instruction, the main control unit 4 determines the current display drive mode according to the display mode control instruction. In the current drive display mode, the display device may be driven to display in the current display mode.

It is to be understood that in different drive display modes, the required partial base voltages V1 have different target values. For example, in the high-power display mode HBN, some base voltages V1 are larger. In a low-power display mode, some base voltages V1 are smaller. For this reason, in this embodiment, after the current drive display mode is determined, the main control unit 4 may obtain the target value of the base voltage V1 corresponding to the current drive display mode.

In S120, the main control unit determines the optimal voltage multiplying relationship of the base voltage in the current drive display mode according to the analog reference voltage signal and the target value of the base voltage and calculates the actual output value of the base voltage according to the analog reference voltage signal and the optimal voltage multiplying relationship to generate the first instruction information including the actual output value.

Optionally, the main control unit 4 determines the optimal voltage multiplying relationship of the base voltage V1 according to the target value of the base voltage V1 and the voltage value of the analog reference voltage signal VCI provided by the power chip 2, calculates the actual output value of the base voltage V1 according to the optimal voltage multiplying relationship and the analog reference voltage signal VCI, and generates the corresponding first instruction information.

The optimal voltage multiplying relationship is used to convert the analog reference voltage signal VCI into the base voltage V1 in the current drive display mode. Through the use of the optimal voltage multiplying relationship, on the basis of ensuring the normal display of the display device, the ratio of the analog reference signal to the actual output value of the base voltage V1 can be increased as much as possible, that is, the conversion efficiency of the base voltage V1 can be improved as much as possible; moreover, the voltage difference between the target value of the base voltage V1 and the actual output value of the base voltage V1 can also be reduced, so that the base voltage V1 output by the drive module matches the current drive display mode, and further, the voltage loss is reduced and the overall power consumption of the display panel 100 is reduced.

In S130, the base voltage generation unit generates the corresponding base voltage according to the first instruction information.

The base voltage generation unit 5 in the driver chip 3 is electrically connected to the main control unit 4. The base voltage generation unit 5 generates the base voltage V1 (including the actual output value) according to the first instruction information and outputs the base voltage V1 to the display panel 100.

Through the preceding solutions, on the basis of ensuring the normal display of the display device, the ratio of the analog reference signal to the actual output value of the base voltage can be increased as much as possible, that is, the conversion efficiency of the base voltage can be improved as much as possible; moreover, the voltage difference between the target value of the base voltage and the actual output value of the base voltage can also be reduced, so that the base voltage output by the drive module matches the current drive display mode, and further, the voltage loss is reduced and the overall power consumption of the display panel is reduced.

The voltage generation method of a drive module according to this embodiment of the present disclosure includes all the technical features and corresponding beneficial effects of the drive module provided by any embodiment of the present disclosure, and the details are not repeated here.

Optionally, in a possible embodiment, the optimal voltage multiplying relationship includes a preset voltage multiplying relationship and an optimal voltage multiplying coefficient in the preset voltage multiplying relationship. The main control unit determines the optimal voltage multiplying relationship of the base voltage in the current drive display mode according to the analog reference voltage signal and the target value of the base voltage and calculates the actual output value of the base voltage according to the analog reference voltage signal and the optimal voltage multiplying relationship in the following manner. The main control unit determines the optimal voltage multiplying coefficient of the base voltage under a preset voltage multiplying relationship in the current drive display mode according to the analog reference voltage signal and the target value of the base voltage and calculates the actual output value of the base voltage according to the analog reference voltage signal, the preset voltage multiplying relationship, and the optimal voltage multiplying coefficient.

With continued reference to FIGS. 1 and 2, and Table 3, the main control unit 4 may prestore analog reference voltage signals VCI, the target values of base voltages V1, the preset voltage multiplying relationships, and different voltage multiplying coefficients in different display modes. After the current display drive mode is determined, the main control unit 4 may determine the optimal voltage multiplying coefficient of the base voltage V1 in the preset voltage multiplying relationship according to the target value of the base voltage V1 and the voltage value of the analog reference voltage signal VCI, calculate the actual output value of the base voltage V1 according to the preset voltage multiplying relationship, the optimal voltage multiplying coefficient, and the analog reference voltage signal VCI, and generate the corresponding first instruction information.

For example, in a possible embodiment, the preset voltage multiplying relationship of the base voltage V1 includes $V1=m*VCI+n*VDDI$. VCI denotes the analog reference voltage signal VCI. VDDI denotes the power supply voltage VDDI received by the driver chip 3. m and n denote voltage multiplying coefficients. m and n are integers.

Optionally, multiple base voltages may include an analog power voltage AVDD, a VCL voltage, a high-level voltage VGH, and a low-level voltage VGL. The drive display mode includes a high-power display mode HBN, a normal display mode, and at least one Always on Display mode AOD.

In a possible embodiment, with reference to Table 3, the preset voltage multiplying relationship of each base voltage may be set in the following manner. For example, the preset voltage multiplying relationship of the analog power voltage AVDD may include AVDD=a*VCI+b*VDDI. The preset voltage multiplying relationship of the VCL voltage may include VCL=−c*VCI. The preset voltage multiplying relationship of the high-level voltage VGH may include VGH=d*AVDD+e*VCI. The preset voltage multiplying relationship of the low-level voltage VGL may include VGL=f*VCL−g*VCI−h*AVDD. VCI denotes the analog reference voltage signal VCI. VDDI denotes the power supply voltage VDDI received by the driver chip 3. a, b, c, d, e, f, g, and h are voltage multiplying coefficients. a, b, c, d, e, f, g, and h are natural numbers.

Figure 8:
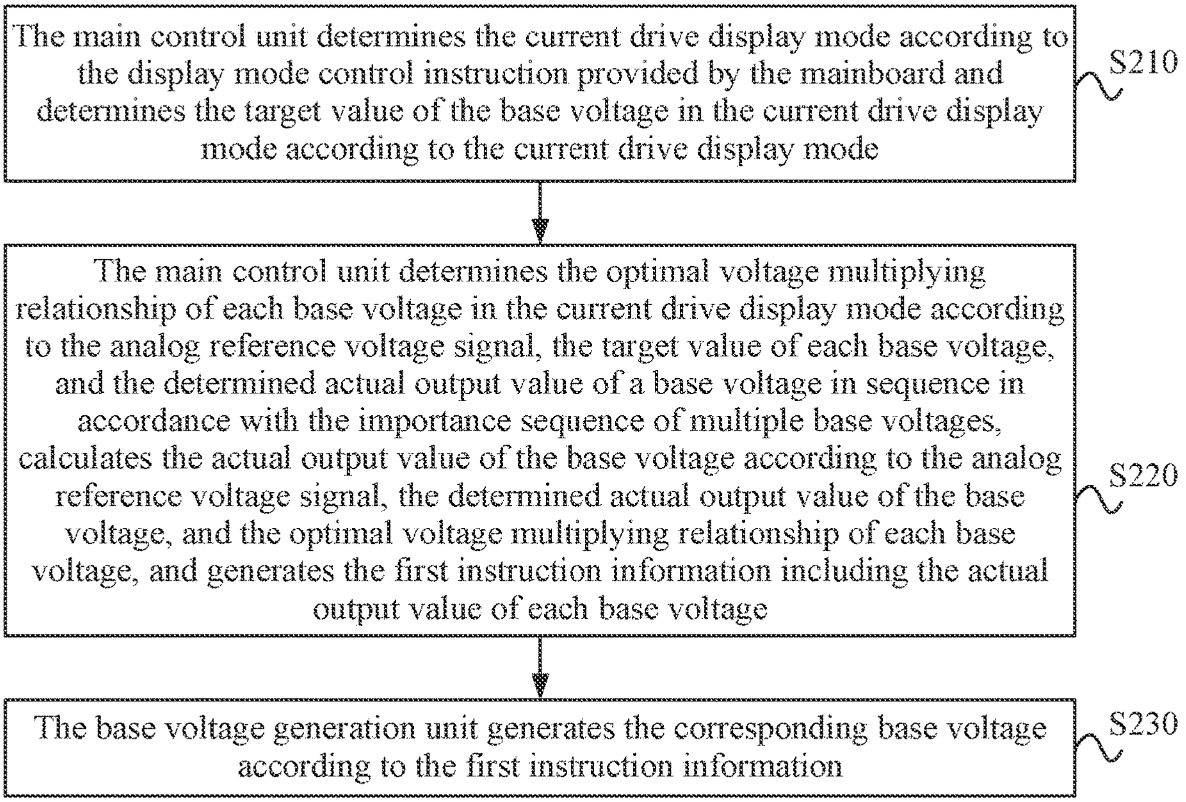
FIG. 8 is a flowchart of another voltage generation method of a drive module according to an embodiment of the present disclosure.

Optionally, FIG. 8 is a flowchart of another voltage generation method of a drive module according to an embodiment of the present disclosure. The voltage generation method shown in FIG. 8 is further refined on the basis of the voltage generation method shown in FIG. 7. In an embodiment, the step S120 in which the main control unit determines the optimal voltage multiplying relationship of the base voltage in the current drive display mode according to the analog reference voltage signal and the target value of the base voltage and calculates the actual output value of the base voltage according to the analog reference voltage signal and the optimal voltage multiplying relationship is refined as the following steps: The main control unit determines the optimal voltage multiplying relationship of each base voltage in the current drive display mode according to the analog reference voltage signal, the target value of each base voltage, and the determined actual output value of the base voltage in sequence in accordance with the importance sequence of multiple base voltages and calculates the actual output value of the base voltage according to the analog reference voltage signal, the determined actual output value of the base voltage, and the optimal voltage multiplying relationship of each base voltage. With reference to FIGS. 2 and 8, the method includes the steps below.

In S210, the main control unit determines the current drive display mode according to the display mode control instruction provided by the mainboard and determines the target value of the base voltage in the current drive display mode according to the current drive display mode.

In S220, the main control unit determines the optimal voltage multiplying relationship of each base voltage in the current drive display mode according to the analog reference voltage signal, the target value of each base voltage, and the determined actual output value of the base voltage in sequence in accordance with the importance sequence of multiple base voltages, calculates the actual output value of the base voltage according to the analog reference voltage signal, the determined actual output value of the base voltage, and the optimal voltage multiplying relationship of each base voltage, and generates the first instruction information including the actual output value of each base voltage.

In general, the larger the power consumption waste caused by the voltage difference between the target value of the base voltage and the actual output value of the base voltage is, the higher the importance of the base voltage is. The main control unit 4 may store the importance of each base voltage. After the current determination mode is determined, the main control unit 4 sequentially determines the optimal voltage multiplying relationship of each base voltage in the current drive display mode according to the importance of each base voltage and calculates the actual output value of each base voltage. In other words, that is, the main control unit 4 first determines the optimal voltage multiplying relationship of a base voltage of higher importance according to the target value of the base voltage of the higher importance, actual output value of the base voltage of the higher importance and determined analog reference signal and calculates the actual output value of the base voltage of the higher importance; and then the main control unit 4 determines the optimal voltage multiplying relationship of the base voltage of lower importance according to the target value of the base voltage of the lower importance, actual output value of the base voltage of the lower importance and determined analog reference signal and calculates the actual output value of the base voltage. Finally, the main control unit 4 outputs the first instruction information including the actual output value of each base voltage.

In a possible embodiment, the order of the importance of the base voltages is the analog power voltage AVDD>the VCL voltage>the high-level voltage VGH>the low-level voltage VGL. For example, as shown in Table 3, in different drive display modes, the optimal voltage multiplying relationships of the analog power voltage AVDD, the VCL voltage, the high-level voltage VGH, and the low-level voltage VGL may be sequentially determined, and the corresponding actual output values may be calculated.

In S230, the base voltage generation unit generates the corresponding base voltage according to the first instruction information.

In this embodiment, the order of determining the optimal voltage multiplying relationship of each base voltage is sorted according to the importance of the base voltage, so that the difference between the actual output value of the base voltage and the target value of the base voltage that has a larger impact on the power consumption is smaller, and the power consumption waste is less. It is beneficial to reduce the overall voltage difference between the actual output value of the base voltage and the target value of the base voltage in different drive display modes, thereby effectively reducing the power consumption.

Optionally, in a possible embodiment, the multiple base voltages include a first base voltage and a second base voltage. The importance of the first base voltage is smaller than the importance of the second base voltage. The main control unit determines the optimal voltage multiplying relationship of each base voltage in the current drive display mode according to the analog reference voltage signal, the target value of each base voltage, and the determined actual output value of the base voltage in sequence in accordance with the importance sequence of the multiple base voltages and calculates the actual output value of the base voltage according to the analog reference voltage signal, the determined actual output value of the base voltage, and the optimal voltage multiplying relationship of each base voltage in the following manners: The optimal voltage multiplying relationship of the first base voltage in the current drive display mode is determined according to the analog reference voltage signal and the target value of the first base voltage, and the actual output value of the first base voltage is calculated according to the analog reference voltage signal and the optimal voltage multiplying relationship of the first base voltage; and the optimal voltage multiplying relationship of the second base voltage in the current drive display mode is determined according to the analog reference voltage signal, the target value of the second base voltage, and the determined actual output value of the first base voltage, and the actual output value of the second base voltage is calculated according to the analog reference voltage signal, the determined actual output value of the first base voltage, and the optimal voltage multiplying relationship of the second base voltage.

Figure 9:
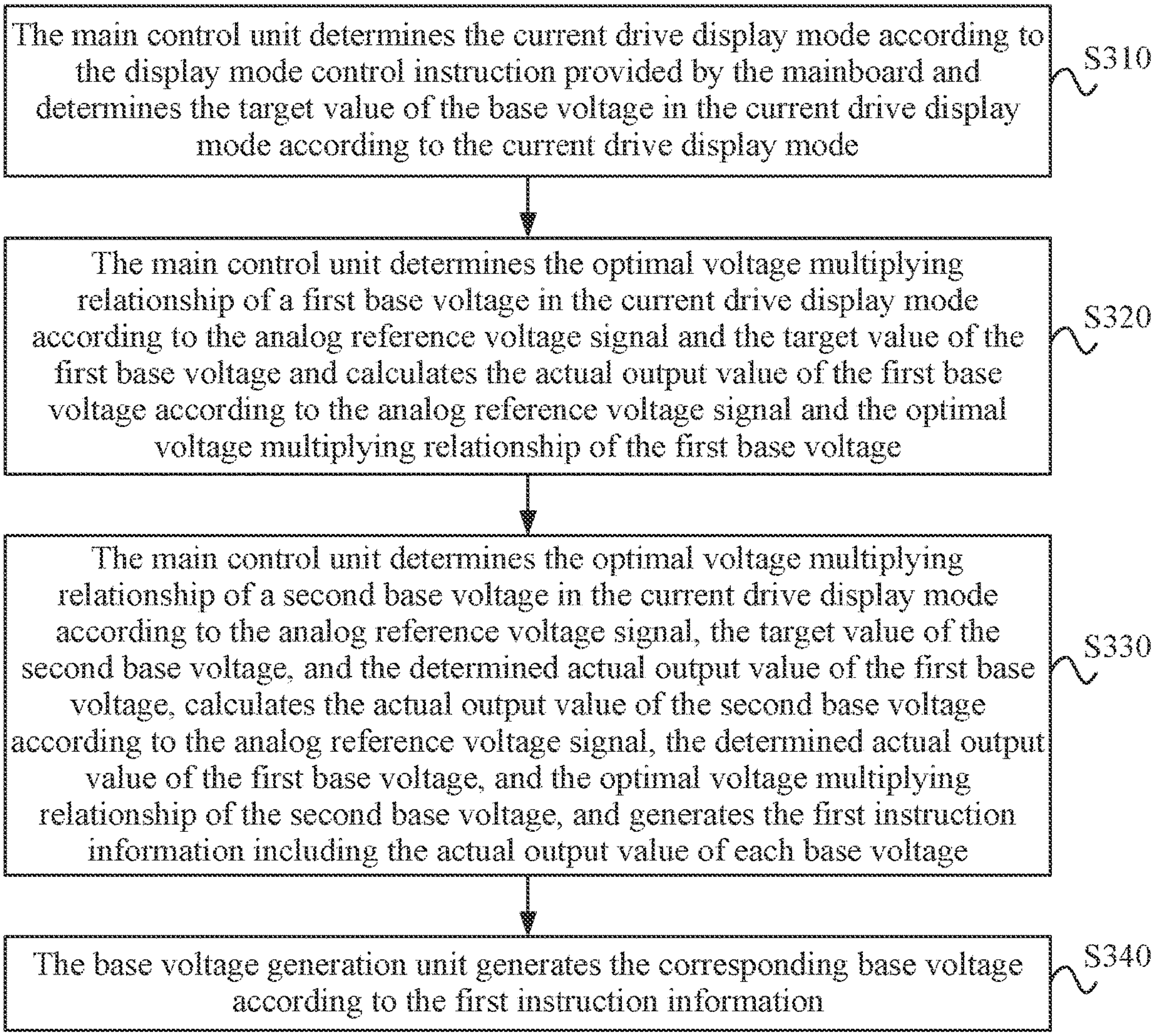
FIG. 9 is a flowchart of another voltage generation method of a drive module according to an embodiment of the present disclosure.

FIG. 9 is a flowchart of another voltage generation method of a drive module according to an embodiment of the present disclosure. With reference to FIGS. 2 and 9, the voltage generation method includes the steps below.

In S310, the main control unit determines the current drive display mode according to the display mode control instruction provided by the mainboard and determines the target value of the base voltage in the current drive display mode according to the current drive display mode.

The multiple base voltages include a first base voltage and a second base voltage. The importance of the first base voltage is smaller than the importance of the second base voltage.

As mentioned in the preceding embodiment, the voltage multiplying methods of some base voltages involve additional base voltages. For example, the analog power voltage AVDD is included in the preset voltage multiplying relationship VGH=d*AVDD+e*VCI of the high-level voltage VGH, and the analog power voltage AVDD and the VCL voltage are included in the preset voltage multiplying relationship VGL=f*VCL−g*VCI−h*AVDD of the low-level voltage VGL, but this embodiment is not limited thereto. The analog power voltage AVDD and the VCL voltage may be the first base voltage. The high-level voltage VGH and the low-level voltage VGL may be the second base voltage. The determination of the voltage multiplying method of the second base voltage is related to the value of the first base voltage.

In S320, the main control unit determines the optimal voltage multiplying relationship of the first base voltage in the current drive display mode according to the analog reference voltage signal and the target value of the first base voltage, and calculates the actual output value of the first base voltage according to the analog reference voltage signal and the optimal voltage multiplying relationship of the first base voltage.

Accordingly, the determination of the voltage multiplying method of the first base voltage is related to the analog reference voltage signal VCI and the target value of the first base voltage. After the current drive display mode is determined, the main control unit 4 may first determine the optimal voltage multiplying relationship of the first base voltage according to the analog reference voltage signal VCI and the target value of the first base voltage and then calculate the actual output value of the first base voltage according to the optimal voltage multiplying relationship and the analog reference voltage signal VCI.

For example, when the current drive display mode is the high-power display mode HBN, the optimal voltage multiplying relationship of the analog power voltage AVDD may be AVDD=VCI, and the optimal voltage multiplying relationship of the VCL voltage may be VCL=−VCI.

In S330, the main control unit determines the optimal voltage multiplying relationship of the second base voltage in the current drive display mode according to the analog reference voltage signal, the target value of the second base voltage, and the determined actual output value of the first base voltage, calculates the actual output value of the second base voltage according to the analog reference voltage signal, the determined actual output value of the first base voltage, and the optimal voltage multiplying relationship of the second base voltage, and generates the first instruction information including the actual output value of each base voltage.

In S340, the base voltage generation unit generates the corresponding base voltage according to the first instruction information.

Optionally, since the voltage multiplying relationship of the second base voltage involves the actual output value of the first base voltage, after the actual output value of the first base voltage is calculated, the main control unit 4 may determine the optimal voltage multiplying relationship of the second base voltage according to the analog reference voltage signal VCI, the target value of the second base voltage, and the determined actual output value of the first base voltage and then calculate the actual output value of the second base voltage. Finally, the main control unit 4 generates the first instruction information including the actual output value of each base voltage.

For example, when the current drive display mode is the high-power display mode HBN, the optimal voltage multiplying relationship of the high-level voltage VGH may be VGH=AVDD, and the optimal voltage multiplying relationship of the low-level voltage VGL may be VGL=VCL.

Optionally, in a possible embodiment, the multiple base voltages also include a third base voltage. The importance of the third base voltage is smaller than the importance of the first base voltage and the importance of the second base voltage. The main control unit determines the optimal voltage multiplying relationship of each base voltage in the current drive display mode according to the analog reference voltage signal, the target value of each base voltage, and the determined actual output value of the base voltage in sequence in accordance with the importance sequence of the multiple base voltages and calculates the actual output value of the base voltage according to the analog reference voltage signal, the determined actual output value of the base voltage, and the optimal voltage multiplying relationship of each base voltage in the following manner. The first base voltage or the second base voltage is bucked and regulated and converted to form the third base voltage. The voltage difference between the actual output value of the third base voltage and the actual output value of the first base voltage or the second basic voltage is larger than a preset range.

Figure 10:
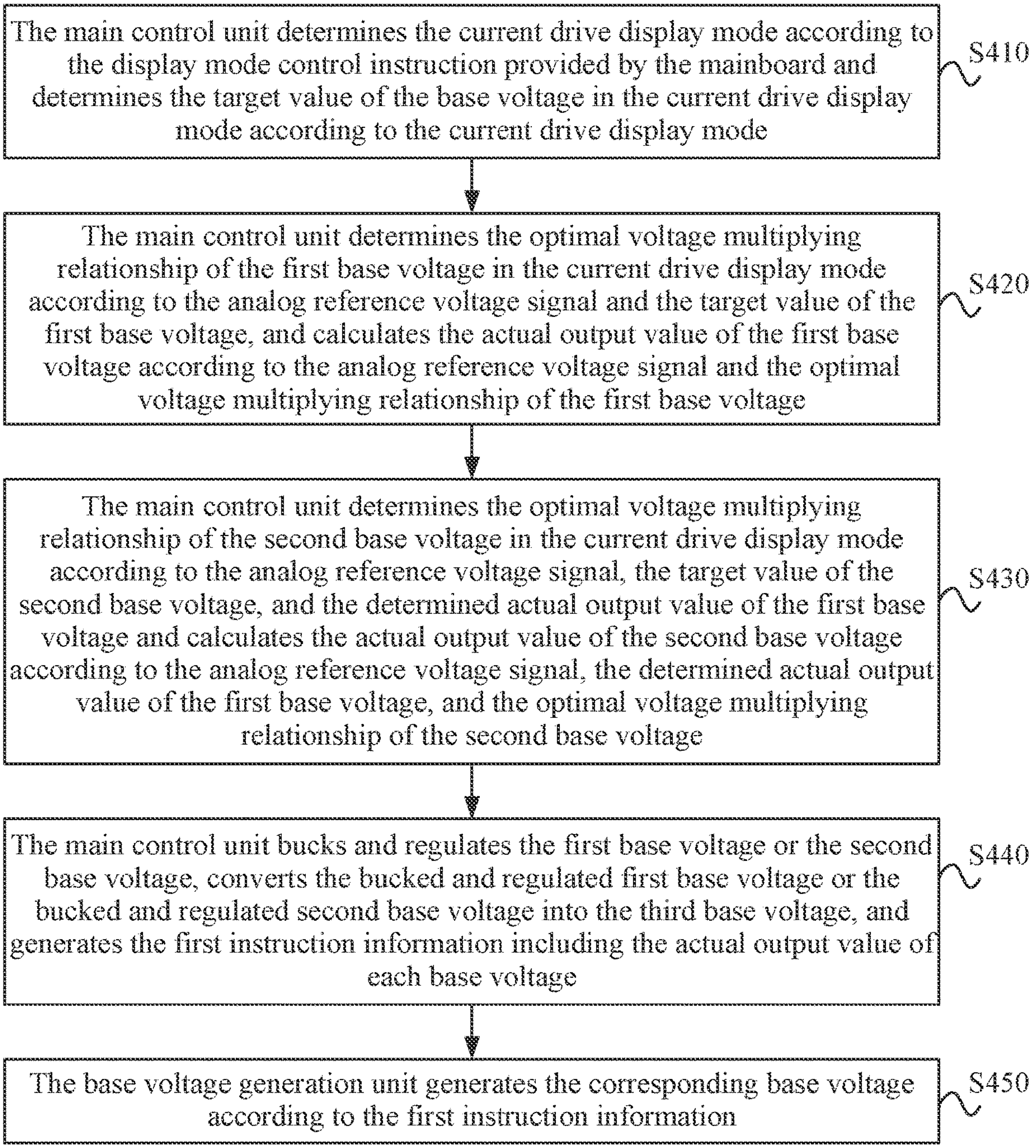
FIG. 10 is a flowchart of another voltage generation method of a drive module according to an embodiment of the present disclosure.

FIG. 10 is a flowchart of another voltage generation method of a drive module according to an embodiment of the present disclosure. With reference to FIGS. 2 and 10, the voltage generation method includes the steps below.

In S410, the main control unit determines the current drive display mode according to the display mode control instruction provided by the mainboard and determines the target value of the base voltage in the current drive display mode according to the current drive display mode.

The multiple base voltages include a first base voltage, a second base voltage, and a third base voltage. The importance of the third base voltage is smaller than the importance of the first base voltage and the importance of the second base voltage.

In an embodiment, among the base voltages output by the driver chip 3, in addition to the first base voltage and the second base voltage which need to be obtained by conversion through a voltage multiplying relationship, partial base voltages may be obtained directly after the first base voltage or the second base voltage is bucked and regulated by the voltage conversion circuit. In general, the third base voltage has a smaller impact on the power consumption of the display device than the first base voltage and the second base voltage. That is, the importance is used as a standard, and various basic voltages may be sorted in the following order: the first base voltage>the second base voltage>the third base voltage.

For example, the third base voltage may include, but is not limited to, the maximum grayscale voltage VGMP, a reference voltage VREFP (or VREFN), a positive terminal power voltage ELVDD, a negative terminal power voltage ELVSS, a high-level output voltage VGHO, and a low-level output voltage VGLO. The maximum grayscale voltage VGMP, the positive terminal power voltage ELVDD, and the reference voltage VREFP may be directly converted from the analog power voltage AVDD. The reference voltage VREFN and the negative power voltage ELVSS may be directly converted from the VCL voltage. The high-level output voltage VGHO may be directly converted from the high-level voltage VGH, and the low-level output voltage VGLO may be directly converted from the low-level voltage VGL.

In S420, the main control unit determines the optimal voltage multiplying relationship of the first base voltage in the current drive display mode according to the analog reference voltage signal and the target value of the first base voltage, and calculates the actual output value of the first base voltage according to the analog reference voltage signal and the optimal voltage multiplying relationship of the first base voltage.

In S430, the main control unit determines the optimal voltage multiplying relationship of the second base voltage in the current drive display mode according to the analog reference voltage signal, the target value of the second base voltage, and the determined actual output value of the first base voltage, and calculates the actual output value of the second base voltage according to the analog reference voltage signal, the determined actual output value of the first base voltage, and the optimal voltage multiplying relationship of the second base voltage.

In S440, the main control unit bucks and regulates the first base voltage or the second base voltage, converts the bucked and regulated first base voltage or the bucked and regulated second base voltage into the third base voltage, and generates the first instruction information including the actual output value of each base voltage.

In S450, the base voltage generation unit generates the corresponding base voltage according to the first instruction information.

Optionally, after the first base voltage or the second base voltage is directly bucked and regulated, the actual output value of the third base voltage can be determined.

For example, the voltage conversion circuit in the base voltage generation unit 5 is LDO. When LDO operates, the voltage difference between the input terminal of LDO and the output terminal of LDO cannot be too small. If the voltage difference is too small, LDO may not operate normally. The voltage difference between the input terminal of LDO and the output terminal of LDO may be the voltage difference between the actual output value of the third base voltage and the actual output value of the first base voltage or the actual output value of the second base voltage. Thus, in the present application, the maximum acceptable voltage difference of LDO may be used as a limiting condition in determining the actual output value of the third base voltage.

Optionally, in this embodiment, the voltage difference between the actual output value of the third base voltage and the actual output value of the first base voltage or the second basic voltage may be made larger than the preset range. The preset range is the acceptable voltage difference range of LDO. Based on this defining condition, on the basis of ensuring the normal operation of the voltage conversion circuit, the overall power consumption of the display device can be reduced.

This embodiment of the present disclosure does not define the specific set value of the preset range, and the skilled in the art may set according to actual requirements. For example, in a possible embodiment, the preset range of the voltage difference between the actual output value of the third base voltage and the actual output value of the first base voltage (or the second base voltage) may be set to 0.1 V, but this embodiment is not limited thereto.

In a specific embodiment, the difference between the actual output value of the analog power voltage AVDD and the actual output value of the maximum grayscale voltage VGMP may be set to be larger than 0.3 V. The difference between the actual output value of the analog power voltage AVDD and the actual output value of the reference voltage VREFP may be set to be larger than 0.3 V. The difference between the actual output value of the analog power voltage AVDD and the actual output value of the positive terminal power voltage ELVDD may be set to be larger than 0.5 V. The difference between the actual output value of the reference voltage VREFN and the actual output value of the VCL voltage may be set to be larger than 0.3 V. The difference between the actual output value of the negative terminal power voltage ELVSS and the actual output value of the VCL voltage may be set to be larger than 0.3 V. However, this embodiment is not limited thereto.

Optionally, in a possible embodiment, the main control unit determines the optimal voltage multiplying relationship of the base voltage in the current drive display mode according to the analog reference voltage signal and the target value of the base voltage and calculates the actual output value of the base voltage according to the analog reference voltage signal and the optimal voltage multiplying relationship in the following manners: According to a first defining condition, the optimal voltage multiplying relationship of the base voltage in the current drive display mode is determined, and the actual output value of the base voltage is calculated. The first defining condition is that the actual output value of the base voltage in the current drive mode is larger than or equal to the target value.

Optionally, in this embodiment, on the basis of ensuring that the actual output value of the base voltage is not smaller than the target value of the base voltage, the optimal voltage multiplying relationship is selected. In this manner, it is not only ensured that the display device operates normally in the current drive display mode, at the same time, but also ensured that the actual output value of the base voltage is close to the target value. Further, the system power consumption is reduced while the drive requirement of the current drive display mode is satisfied.

Figure 11:
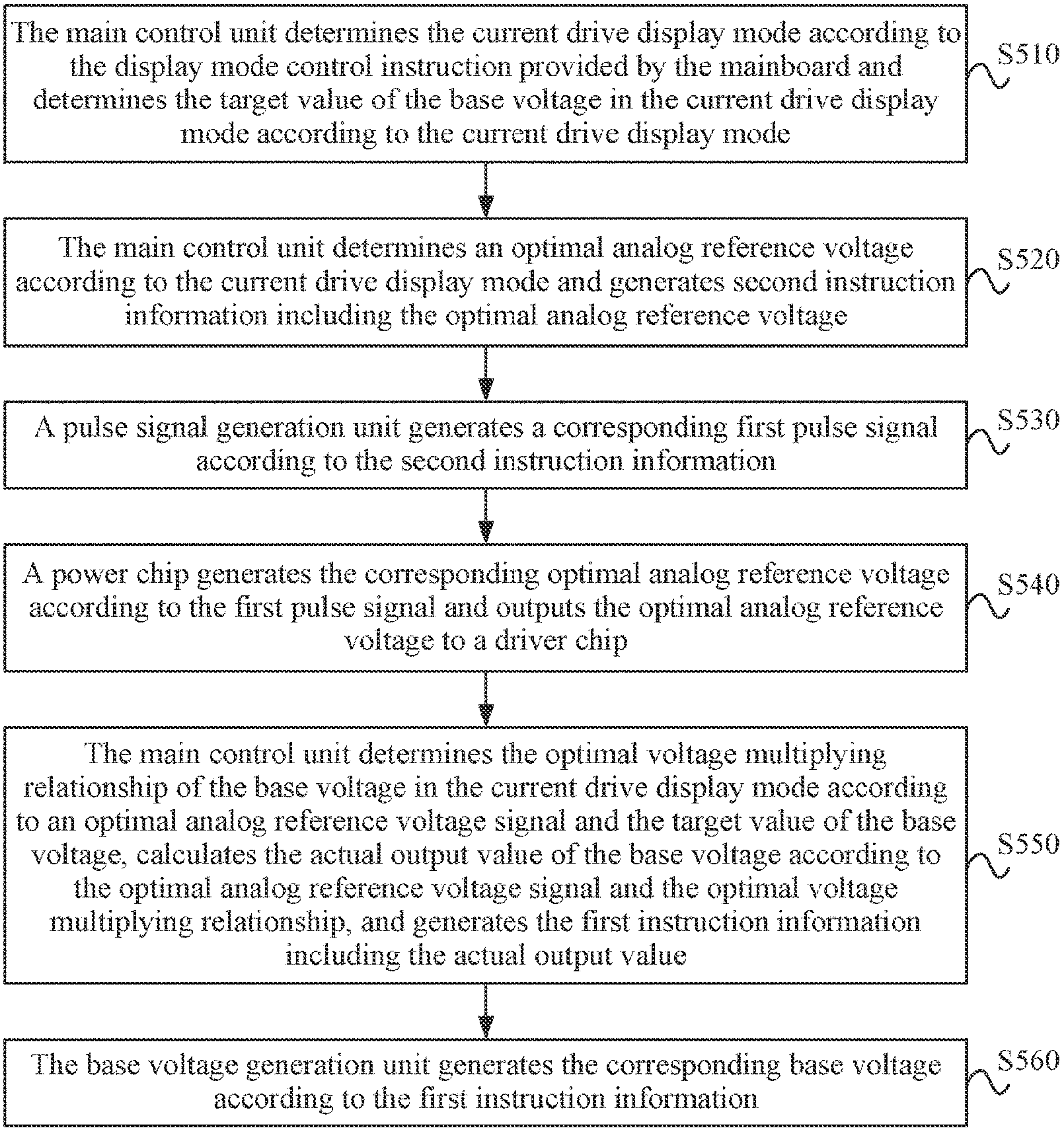
FIG. 11 is a flowchart of another voltage generation method of a drive module according to an embodiment of the present disclosure.

Optionally, in a possible embodiment, the driver chip 3 also includes a pulse signal generation unit 6. The pulse signal generation unit 6 is electrically connected to the main control unit 4 and the power chip 2 respectively. FIG. 11 is a flowchart of another voltage generation method of a drive module according to an embodiment of the present disclosure. The method shown in FIG. 11 is further refined on the basis of the preceding embodiment. Referring to FIGS. 3 and 11, the voltage generation method includes the steps below.

In S510, the main control unit determines the current drive display mode according to the display mode control instruction provided by the mainboard and determines the target value of the base voltage in the current drive display mode according to the current drive display mode.

In S520, the main control unit determines an optimal analog reference voltage according to the current drive display mode and generates the second instruction information including the optimal analog reference voltage.

In an embodiment, after the main control unit 4 determines the current drive display mode, the main control unit 4 may determine the optimal analog reference voltage signal VCI in the current drive display mode and generate the second instruction information based on the optimal analog reference voltage signal VCI. The execution order of S510 and S520 is not limited.

In S530, the pulse signal generation unit generates the corresponding first pulse signal according to the second instruction information.

The second instruction information is transmitted by the main control unit 4 to the pulse signal generation unit 6. The pulse signal generation unit 6 may generate the corresponding first pulse signal according to the received second instruction information. The first pulse signal corresponds to the optimal analog reference voltage signal VCI.

In S540, the power chip generates the corresponding optimal analog reference voltage according to the first pulse signal and outputs the optimal analog reference voltage to the driver chip.

Optionally, the first pulse signal is transmitted to the power chip 2 by the pulse signal generation unit 6. The power chip 2 may parse the first pulse signal to determine the value of the optimal analog reference voltage signal VCI in the current drive display mode and output the value.

In S550, the main control unit determines the optimal voltage multiplying relationship of the base voltage in the current drive display mode according to the optimal analog reference voltage signal and the target value of the base voltage, calculates the actual output value of the base voltage according to the optimal analog reference voltage signal and the optimal voltage multiplying relationship, and generates the first instruction information including the actual output value.

Optionally, the optimal analog reference voltage signal VCI output by the power chip 2 is transmitted to the driver chip 3. At this time, the main control unit 4 of the driver chip 3 may select an optimal voltage multiplying relationship according to the optimal analog reference voltage signal VCI and the target value of the base voltage, calculate the actual output value of the base voltage according to the optimal analog reference voltage signal VCI and the optimal voltage multiplying relationship, and output the first instruction information. The base voltage generation unit 5 outputs the base voltage according to the optimal voltage multiplying relationship on the basis of the optimal analog reference voltage signal VCI.

In S560, the base voltage generation unit generates the corresponding base voltage according to the first instruction information.

In this embodiment, the drive module may generate the optimal analog reference voltage signal VCI corresponding to the current drive display mode according to the current drive display mode and can simultaneously improve the conversion efficiency of the analog reference voltage signal VCI at the power chip 2 and the conversion efficiency of the base voltage V1 at the driver chip 3, thereby further reducing the waste of the power consumption of the display device and reducing the overall power consumption.

Optionally, in a possible embodiment, the voltage generation method also includes the following steps: The main control unit determines the power supply voltage according to the current drive display mode, generates the third instruction information including the power supply voltage, and sends the third instruction information to the pulse signal generation unit or the base voltage generation unit; the pulse signal generation unit generates the corresponding second pulse signal according to the third instruction information; the power chip generates the corresponding power supply voltage according to the second pulse signal and outputs the corresponding power supply voltage; or the base voltage generation unit generates the power supply voltage according to the third instruction information and the optimal analog reference voltage signal and outputs the power supply voltage.

With reference to FIG. 3, in this embodiment, the main control unit 4 may also determine the power supply voltage required for the display panel in the current drive display mode according to the current drive display mode. After the power supply voltage required in the current drive display mode is determined, the main control unit 4 may generate the corresponding third instruction information and send the third instruction information to the pulse signal generation unit 6 or the base voltage generation unit 5.

When the power supply voltage is provided by the power chip 2, the pulse signal generation unit 6 in the driver chip 3 may generate the corresponding second pulse signal after receiving the third instruction information, and the power chip 2 may generate the corresponding power supply voltage according to the second pulse signal and output the corresponding power supply voltage to the display panel 100.

When the power supply voltage is provided by the driver chip 3, since the source of the base voltage output by the driver chip 3 is the analog reference voltage signal VCI, the base voltage generation module in the driver chip 3 may generate the corresponding power supply voltage according to the third instruction information and the optimal analog reference voltage signal VCI in the current drive display mode after receiving the third instruction information and output the corresponding power supply voltage to the display panel 100.

Optionally, in a possible embodiment, the drive display mode may include a high-power display mode HBN, a normal display mode, and at least one Always on Display mode AOD. The main control unit determines the power supply voltage according to the current drive display mode, generates the third instruction information including the power supply voltage, and sends the third instruction information to the pulse signal generation unit or the base voltage generation unit in the following manners: When the current drive display mode is the high-power display mode or the normal display mode, the main control unit determines a first power supply voltage, generates the third instruction information comprising the first power supply voltage, and send the third instruction information to the pulse signal generation unit; and when the current drive display mode is the Always on Display mode, the main control unit determines a second power supply voltage, generates the third instruction information comprising the second power supply voltage, and sends the third instruction information to the base voltage generation unit.

In an embodiment, the high-power display mode HBN, the normal display mode, and the at least one Always on Display mode AOD are the same as those in the preceding embodiment, and the details are not repeated here. It can be seen from the preceding embodiment that relatively speaking, the power supply voltage values required for the display panel in the high-power display mode HBN and the normal display mode are relatively large, and the power supply voltage value required for the display panel in the Always on Display mode AOD is relatively small.

Thus, with reference to FIGS. 1 and 3, in this embodiment, when the main control unit 4 acquires that the current drive display mode is the high-power display mode HBN or the normal display mode, the main control unit 4 may determine the first power supply voltage PVDD1 (PVEE1), generate the third instruction information corresponding to the first power supply voltage PVDD1 (PVEE1), and send the third instruction information to the pulse signal generation unit 6. The pulse signal generation unit 6 generates the corresponding second pulse signal after receiving the third instruction information. The power chip 2 outputs the first power supply voltage PVDD1 (PVEE1) to the display panel after receiving the second pulse signal. At this time, the power supply voltage output terminal of the driver chip 3 is in a high resistance state.

Accordingly, when the main control unit 4 acquires that the current drive display mode is the Always on Display mode AOD, the main control unit 4 may determine the second power supply voltage PVDD2 (PVEE2), generate the third instruction information corresponding to the second power supply voltage PVDD2 (PVEE2), and sends the third instruction information to the base voltage generation unit 5. The base voltage generation unit 5 outputs the second power supply voltage PVDD2 (PVEE2) to the display panel after receiving the third instruction information. At this time, the power supply voltage output terminal of the power chip 2 is in a high resistance state.

In this embodiment, when the power supply voltage value required in the current drive display mode is large, the power chip 2 may generate and output a power supply voltage signal. When the power supply voltage value required in the current drive display mode is small, the driver chip 3 may generate and output the power supply voltage. The problem that in the Always on Display mode AOD, the power chip 2 still needs to operate is solved, thereby reducing the power consumption of the power chip 2.

In a possible embodiment, with reference to FIG. 5, the driver chip 3 also includes a source drive unit 7 and a gate drive unit 8. The source drive unit 7 and the gate drive unit 8 are electrically connected to the main control unit 4 respectively. The main control unit 4 is also configured to generate the fourth instruction information including the source drive voltage. The source drive unit 7 is configured to generate the corresponding source drive voltage according to the fourth instruction information. The main control unit 4 is also configured to generate the fifth instruction information including the gate drive voltage. The gate drive unit 8 is configured to generate the corresponding gate drive voltage according to the fifth instruction information.

It is to be noted that the preceding are only preferred embodiments of the present disclosure and the technical principles used therein. It is to be understood by those skilled in the art that the present disclosure is not limited to the embodiments described herein. For those skilled in the art, various apparent modifications, adaptations, combinations, and substitutions can be made without departing from the scope of the present disclosure. Therefore, while the present disclosure is described in detail in connection with the preceding embodiments, the present disclosure is not limited to the preceding embodiments and may include equivalent embodiments without departing from the concept of the present disclosure. The scope of the present disclosure is determined by the scope of the appended claims.

What is claimed is:

1. A drive module, comprising a mainboard, a power chip, and a driver chip, wherein the driver chip is electrically connected to the mainboard and the power chip respectively;

the power chip is configured to provide an analog reference voltage signal to the driver chip; the mainboard is configured to send a display mode control instruction to the driver chip; and the driver chip is configured to output a plurality of base voltages; and the driver chip comprises a main control unit and a base voltage generation unit, wherein the main control unit is configured to determine a current drive display mode according to the display mode control instruction and further configured to determine a target value of a base voltage of the plurality of base voltages in the current drive display mode according to the current drive display mode, determine an optimal voltage multiplying relationship of the base voltage in the current drive display mode according to the analog reference voltage signal and the target value of the base voltage, calculate an actual output value of the base voltage according to the analog reference voltage signal and the optimal voltage multiplying relationship, and generate first instruction information comprising the actual output value; and the base voltage generation unit is configured to generate the corresponding base voltage according to the first instruction information.

2. The drive module according to claim 1, wherein the optimal voltage multiplying relationship comprises a preset voltage multiplying relationship and an optimal voltage multiplying coefficient under the preset voltage multiplying relationship; and the main control unit is further configured to determine an optimal voltage multiplying coefficient of the base voltage under a preset voltage multiplying relationship in the current drive display mode according to the analog reference voltage signal and the target value of the base voltage and calculate the actual output value of the base voltage according to the analog reference voltage signal, the preset voltage multiplying relationship, and the optimal voltage multiplying coefficient.

3. The drive module according to claim 2, wherein the preset voltage multiplying relationship of the base voltage V1 comprises V1=m*VCI+n*VDDI, wherein VCI denotes the analog reference voltage signal, VDDI denotes a power supply voltage received by the driver chip, and m and n denote voltage multiplying coefficients, wherein m and n are integers.

4. The drive module according to claim 2, wherein the plurality of base voltages comprise an analog power voltage, a VCL voltage, a high-level voltage, and a low-level voltage, and a drive display mode comprises a high-power display mode, a normal display mode, and at least one Always on Display mode.

5. The drive module according to claim 4, wherein a preset voltage multiplying relationship of the analog power voltage AVDD comprises AVDD=a*VCI+b*VDDI;

a preset voltage multiplying relationship of the VCL voltage comprises VCL=−c*VCI;

a preset voltage multiplying relationship of the high-level voltage VGH comprises VGH=d*AVDD+e*VCI; and a preset voltage multiplying relationship of the low-level voltage VGL comprises VGL=f*VCL— g*VCI— h*AVDD, wherein VCI denotes the analog reference voltage signal, VDDI denotes a power supply voltage received by the driver chip, a, b, c, d, e, f, g, and h are voltage multiplying coefficients, and a, b, c, d, e, f, g, and h are natural numbers.

6. The drive module according to claim 3, wherein the mainboard is further configured to provide the power supply voltage VDDI to the driver chip.

7. The drive module according to claim 1, wherein the actual output value of the base voltage in the current drive display mode is larger than or equal to the target value.

8. The drive module according to claim 1, wherein the driver chip further comprises a pulse signal generation unit, and the pulse signal generation unit is electrically connected to the main control unit and the power chip respectively;

the main control unit is further configured to determine an optimal analog reference voltage signal according to the current drive display mode and generate second instruction information comprising the optimal analog reference voltage signal;

the pulse signal generation unit is configured to generate a corresponding first pulse signal according to the second instruction information;

the power chip is configured to generate the corresponding optimal analog reference voltage signal according to the first pulse signal and output the optimal analog reference voltage signal to the driver chip; and the main control unit is further configured to determine the optimal voltage multiplying relationship of the base voltage in the current drive display mode according to the optimal analog reference voltage signal and the target value of the base voltage, calculate the actual output value of the base voltage according to the optimal analog reference voltage signal and the optimal voltage multiplying relationship, and generate the first instruction information comprising the actual output value.

9. The drive module according to claim 8, wherein the main control unit is further configured to determine a power supply voltage according to the current drive display mode, generate third instruction information comprising the power supply voltage, and send the third instruction information to the pulse signal generation unit or the base voltage generation unit;

the pulse signal generation unit is further configured to generate a corresponding second pulse signal according to the third instruction information, and the power chip is further configured to generate the corresponding power supply voltage according to the second pulse signal and output the corresponding power supply voltage; or the base voltage generation unit is further configured to generate the power supply voltage according to the third instruction information and the optimal analog reference voltage signal and output the power supply voltage.

10. The drive module according to claim 1, wherein the driver chip further comprises a source drive unit and a gate drive unit, and the source drive unit and the gate drive unit are electrically connected to the main control unit respectively;

the main control unit is configured to generate fourth instruction information comprising a source drive voltage, and the source drive unit is configured to generate the corresponding source drive voltage according to the fourth instruction information; and the main control unit is configured to generate fifth instruction information comprising a gate drive voltage, and the gate drive unit is configured to generate the corresponding gate drive voltage according to the fifth instruction information.

11. A display device, comprising a drive module, wherein the drive module comprises a mainboard, a power chip, and a driver chip, wherein the driver chip is electrically connected to the mainboard and the power chip respectively;

the power chip is configured to provide an analog reference voltage signal to the driver chip; the mainboard is configured to send a display mode control instruction to the driver chip; and the driver chip is configured to output a plurality of base voltages; and the driver chip comprises a main control unit and a base voltage generation unit, wherein the main control unit is configured to determine a current drive display mode according to the display mode control instruction and further configured to determine a target value of a base voltage of the plurality of base voltages in the current drive display mode according to the current drive display mode, determine an optimal voltage multiplying relationship of the base voltage in the current drive display mode according to the analog reference voltage signal and the target value of the base voltage, calculate an actual output value of the base voltage according to the analog reference voltage signal and the optimal voltage multiplying relationship, and generate first instruction information comprising the actual output value; and the base voltage generation unit is configured to generate the corresponding base voltage according to the first instruction information.

12. A voltage generation method of a drive module, wherein the drive module comprises a mainboard, a power chip, and a driver chip, wherein the driver chip is electrically connected to the mainboard and the power chip respectively; the driver chip comprises a main control unit and a base voltage generation unit; the power chip is configured to provide an analog reference voltage signal to the driver chip; the mainboard is configured to send a display mode control instruction to the driver chip; and the driver chip is configured to output a plurality of base voltages; and the voltage generation method comprises the following steps:

determining, by the main control unit, a current drive display mode according to the display mode control instruction provided by the mainboard and determining a target value of a base voltage of the plurality of base voltages in the current drive display mode according to the current drive display mode;

determining, by the main control unit, an optimal voltage multiplying relationship of the base voltage in the current drive display mode according to the analog reference voltage signal and the target value of the base voltage, calculating an actual output value of the base voltage according to the analog reference voltage signal and the optimal voltage multiplying relationship, and generating first instruction information comprising the actual output value; and generating, by the base voltage generation unit, the corresponding base voltage according to the first instruction information.

13. The voltage generation method according to claim 12, wherein the optimal voltage multiplying relationship comprises a preset voltage multiplying relationship and an optimal voltage multiplying coefficient in the preset voltage multiplying relationship; and determining, by the main control unit, the optimal voltage multiplying relationship of the base voltage in the current drive display mode according to the analog reference voltage signal and the target value of the base voltage and calculating the actual output value of the base voltage according to the analog reference voltage signal and the optimal voltage multiplying relationship comprises:

determining, by the main control unit, an optimal voltage multiplying coefficient of the base voltage under a preset voltage multiplying relationship in the current drive display mode according to the analog reference voltage signal and the target value of the base voltage and calculating the actual output value of the base voltage according to the analog reference voltage signal, the preset voltage multiplying relationship, and the optimal voltage multiplying coefficient.

14. The voltage generation method according to claim 12, wherein determining, by the main control unit, the optimal voltage multiplying relationship of the base voltage in the current drive display mode according to the analog reference voltage signal and the target value of the base voltage and calculating the actual output value of the base voltage according to the analog reference voltage signal and the optimal voltage multiplying relationship comprises:

determining, by the main control unit, an optimal voltage multiplying relationship of each of the plurality of base voltages in the current drive display mode according to the analog reference voltage signal, a target value of the each base voltage and a determined actual output value of a preset base voltage of the plurality of base voltages in sequence in accordance with an importance sequence of the plurality of base voltages, and calculating the actual output value of the base voltage according to the analog reference voltage signal, the determined actual output value of the preset base voltage, and the optimal voltage multiplying relationship of the each base voltage.

15. The voltage generation method according to claim 14, wherein the plurality of base voltages comprise a first base voltage and a second base voltage, and importance of the first base voltage is smaller than importance of the second base voltage; and determining, by the main control unit, the optimal voltage multiplying relationship of the each base voltage in the current drive display mode according to the analog reference voltage signal, the target value of the each base voltage and the determined actual output value of the preset base voltage in sequence in accordance with the importance sequence of the plurality of base voltages, and calculating the actual output value of the base voltage according to the analog reference voltage signal, the determined actual output value of the preset base voltage, and the optimal voltage multiplying relationship of the each base voltage comprises:

determining, by the main control unit, an optimal voltage multiplying relationship of the first base voltage in the current drive display mode according to the analog reference voltage signal and a target value of the first base voltage, and calculating an actual output value of the first base voltage according to the analog reference voltage signal and the optimal voltage multiplying relationship of the first base voltage; and determining, by the main control unit, an optimal voltage multiplying relationship of the second base voltage in the current drive display mode according to the analog reference voltage signal, a target value of the second base voltage, and the determined actual output value of the first base voltage, and calculating an actual output value of the second base voltage according to the analog reference voltage signal, the determined actual output value of the first base voltage, and the optimal voltage multiplying relationship of the second base voltage.

16. The voltage generation method according to claim 15, wherein the plurality of base voltages further comprise a third base voltage, and importance of the third base voltage is smaller than the importance of the first base voltage and the importance of the second base voltage; and determining, by the main control unit, the optimal voltage multiplying relationship of the each base voltage in the current drive display mode according to the analog reference voltage signal, the target value of the each base voltage, and the determined actual output value of the preset base voltage in sequence in accordance with the importance sequence of the plurality of base voltages, and calculating the actual output value of the preset base voltage according to the analog reference voltage signal, the determined actual output value of the base voltage, and the optimal voltage multiplying relationship of the each base voltage comprises:

bucking and regulating, by the main control unit, the first base voltage or the second base voltage and converting the bucked and regulated first base voltage or the bucked and regulated second base voltage into the third base voltage, wherein a voltage difference between an actual output value of the third base voltage and the actual output value of the first base voltage or the second basic voltage is larger than a preset range.

17. The voltage generation method according to claim 12, wherein determining, by the main control unit, the optimal voltage multiplying relationship of the base voltage in the current drive display mode according to the analog reference voltage signal and the target value of the base voltage and calculating the actual output value of the base voltage according to the analog reference voltage signal and the optimal voltage multiplying relationship comprises:

determining, by the main control unit according to a first defining condition, the optimal voltage multiplying relationship of the base voltage in the current drive display mode, and calculating the actual output value of the base voltage, wherein the first defining condition is that the actual output value of the base voltage in a current drive mode is larger than or equal to the target value.

18. The voltage generation method according to claim 12, wherein the driver chip further comprises a pulse signal generation unit, and the pulse signal generation unit is electrically connected to the main control unit and the power chip respectively; and the voltage generation method further comprises:

determining, by the main control unit, an optimal analog reference voltage signal according to the current drive display mode and generating second instruction information comprising the optimal analog reference voltage signal;

generating, by the pulse signal generation unit, a corresponding first pulse signal according to the second instruction information;

generating, the power chip, the corresponding optimal analog reference voltage signal according to the first pulse signal and outputs the optimal analog reference voltage signal to the driver chip; and determining, by the main control unit, the optimal voltage multiplying relationship of the base voltage in the current drive display mode according to the analog reference voltage signal and the target value of the base voltage and calculating the actual output value of the base voltage according to the analog reference voltage signal and the optimal voltage multiplying relationship comprises:

determining, by the main control unit, the optimal voltage multiplying relationship of the base voltage in the current drive display mode according to the optimal analog reference voltage signal and the target value of the base voltage and calculating the actual output value of the base voltage according to the optimal analog reference voltage signal and the optimal voltage multiplying relationship.

19. The voltage generation method according to claim 18, further comprising:

determining, by the main control unit, a power supply voltage according to the current drive display mode, generating third instruction information comprising the power supply voltage, and sending the third instruction information to the pulse signal generation unit or the base voltage generation unit; and generating, by the pulse signal generation unit, a corresponding second pulse signal according to the third instruction information, and generating and outputting, by the power chip, the corresponding power supply voltage according to the second pulse signal; or generating, by the base voltage generation unit, the power supply voltage according to the third instruction information and the optimal analog reference voltage signal and outputting the power supply voltage.

20. The voltage generation method according to claim 19, wherein a drive display mode comprises a high-power display mode, a normal display mode, and at least one Always on Display mode; and determining, by the main control unit, the power supply voltage according to the current drive display mode, generating the third instruction information comprising the power supply voltage, and sending the third instruction information to the pulse signal generation unit or the base voltage generation unit comprises:

when the current drive display mode is the high-power display mode or the normal display mode, determining, by the main control unit, a first power supply voltage, generating the third instruction information comprising the first power supply voltage, and sending the third instruction information to the pulse signal generation unit; and when the current drive display mode is the Always on Display mode, determining, by the main control unit, a second power supply voltage, generating the third instruction information comprising the second power supply voltage, and sending the third instruction information to the base voltage generation unit.

* * * * *